(12) United States Patent
Ramabadran et al.

(10) Patent No.: US 11,799,646 B2
(45) Date of Patent: Oct. 24, 2023

(54) ENCRYPTION METHOD

(71) Applicant: National University of Ireland, Maynooth, Maynooth (IE)

(72) Inventors: Prasidh Ramabadran, Maynooth (IE); David Malone, Dublin (IE); John Dooley, Maynooth (IE); Ronan Farrell, Kilcock (IE)

(73) Assignee: National University of Ireland, Maynooth

( * ) Notice: Subject to any disclaimer, the term of this patent is extended or adjusted under 35 U.S.C. 154(b) by 263 days.

(21) Appl. No.: 17/286,643

(22) PCT Filed: Oct. 21, 2019

(86) PCT No.: PCT/EP2019/078610
§ 371 (c)(1),
(2) Date: Apr. 19, 2021

(87) PCT Pub. No.: WO2020/079284
PCT Pub. Date: Apr. 23, 2020

(65) Prior Publication Data
US 2021/0377014 A1    Dec. 2, 2021
US 2022/0150063 A2    May 12, 2022

(30) Foreign Application Priority Data
Oct. 19, 2018   (GB) ..................... 1817117

(51) Int. Cl.
*H04L 9/08*     (2006.01)
*H04W 12/79*    (2021.01)
(Continued)

(52) U.S. Cl.
CPC ......... *H04L 9/0875* (2013.01); *H04W 12/037* (2021.01); *H04W 12/122* (2021.01); *H04W 12/79* (2021.01)

(58) Field of Classification Search
CPC ... H04L 2209/80; H04L 9/001; H04L 9/0875; H04L 27/10; H04L 63/0428;
(Continued)

(56) References Cited

U.S. PATENT DOCUMENTS 6,157,679 A    12/2000  Johnson
7,050,521 B1*   5/2006  Alavi ................ H04L 27/2675
                                                            375/362
(Continued)

FOREIGN PATENT DOCUMENTS

WO    2006081122    8/2006

OTHER PUBLICATIONS

Aronhime, P. All-Pass Filters. Wiley Encyclopedia of Electrical and Electronics Engineering, J.G. Webster (Ed.). (1999) https://doi.org/10.1002/047134608X.W2203. (Year: 1999).*

(Continued)

*Primary Examiner* — Michael Simitoski
(74) *Attorney, Agent, or Firm* — BEHMKE INNOVATION GROUP LLC; James M. Behmke; Jonathon P. Western

(57) ABSTRACT

Disclosed is a method of encrypting a data signal for providing to an input of a radio frequency transmitter, such as modulated baseband signals in the physical layer for wireless transmission. The method comprises receiving the data signal comprising one or more first frequency components with a first phase profile in a frequency band of interest; applying a dispersive encrypting signal filter to the data signal to generate an encrypted data signal comprising the one or more frequency components with a second phase profile, wherein the second phase profile is different to the first phase profile. Decryption is achieved by applying a (Continued)

decrypting filter to the encrypted data signal to substantially reverse the effect of the encrypting filter and recover the first phase profile.

21 Claims, 12 Drawing Sheets

(51) Int. Cl.
*H04W 12/122* (2021.01)
*H04W 12/037* (2021.01)

(58) Field of Classification Search
CPC . H04W 12/03; H04W 12/037; H04W 12/041; H04W 12/122; H04W 12/79
See application file for complete search history.

(56) References Cited

U.S. PATENT DOCUMENTS

| 8,645,678 | B2 | 2/2014 | Al-Dweik et al. | |
|---|---|---|---|---|
| 2003/0026197 | A1 | 2/2003 | Crawford | |
| 2006/0062320 | A1* | 3/2006 | Luz | H04K 1/006 375/269 |
| 2008/0268789 | A1* | 10/2008 | Plaumann | H03F 1/0211 455/67.14 |
| 2009/0017784 | A1* | 1/2009 | Dickson | H03H 21/0012 455/296 |
| 2012/0106742 | A1* | 5/2012 | Bharitkar | H03G 3/3089 381/98 |
| 2016/0119077 | A1* | 4/2016 | Hu | H04B 10/516 398/76 |
| 2017/0187553 | A1* | 6/2017 | Nedovic | H04L 25/03343 |
| 2018/0241508 | A1* | 8/2018 | Chervyakov | H04L 27/2675 |
| 2019/0320303 | A1* | 10/2019 | Agee | H04B 1/7103 |

OTHER PUBLICATIONS

Benthien, George W. "Digital Encoding And Decoding." (2007). (Year: 2007).*

Huo, Fei, and Guang Gong. "A new efficient physical layer OFDM encryption scheme." IEEE INFOCOM 2014—IEEE Conference on Computer Communications. IEEE, 2014. (Year: 2014).*

Petrovic, Miljan. (2014). Digital Signal Filtering as a Method of Data Encryption. (Year: 2014).*

J. Zhang, A. Marshall, R. Woods and T. Q. Duong, "Design of an OFDM Physical Layer Encryption Scheme," in IEEE Transactions on Vehicular Technology, vol. 66, No. 3, pp. 2114-2127, Mar. 2017, doi: 10.1109/TVT.2016.2571264. (Year: 2017).*

Zölzer, Udo et al. DAFX—Digital Audio Effects. Newark: Wiley, 2002. Print, pp. 31-62. (Year: 2002).*

Wikipedia. "All-pass filter" (2017). (Year: 2017).*

* cited by examiner

Frequency
(Centre frequency 14.23 GHz, 10 MHz/div, span 100 MHz)

ENCRYPTION METHOD

RELATED APPLICATION

This application is a U.S. National Phase Application of International Application No. PCT/EP2019/078610, filed Oct. 21, 2019, which claims priority to GB 1817117.3, filed Oct. 19, 2018, the disclosures of which are incorporated herein by reference.

TECHNICAL FIELD

This invention relates to a method of encrypting a data signal, particular, but not exclusively, modulated baseband signals in the physical layer for wireless transmission. The invention also relates to a method of decrypting a data signal encrypted according to the method.

BACKGROUND TO THE INVENTION

Modern wireless communications involve transmission of data through wide bandwidth modulated Radio Frequency (RF) channels. This involves generation of a high frequency RF signal known as a carrier signal whose parameters, namely amplitude, phase and/or frequency, are modulated according the modulation scheme and the data intended to be transmitted by the carrier signal between the nodes in the network.

The security of wireless communications has been conventionally handled in the higher layers of the network protocol stack, such as the data link layer, using techniques such as scrambling and shared data encryption keys that attempt to secure the data before transmission. These schemes, however, do not secure the air interface parameters such as the modulation scheme and leave them susceptible to eavesdropping and interception by man-in-the-middle platforms.

Recently, keyless physical (PHY) layer (i.e. the lowest layer in the network protocol stack where the raw interchange between bits of data and modulated signal waveforms takes place) security schemes have been proposed, such as directional modulation (DM), RF fingerprinting, and discrete Fourier transform spread orthogonal frequency division multiplexing (DFT S OFDM). In DM, the transmitter is configured to project data modulated carrier signals preferentially into pre-determined spatial direction in free space while distorting the constellation formats of the modulation symbols (i.e. amplitude, phase and/or frequency) of the carrier signals projected in all other directions. This reduces the chance of interception, but requires specific beam forming transmitters. RF fingerprinting utilises the unique device-specific PHY layer signatures (e.g. phase at onset of transmission, frequency/phase offsets etc.) present in the transmitted carrier signals to identify individual (legitimate) devices. This allows detection of rogue access points, but replies on the robustness of the PHY layer features (which may vary due to environmental factors and device location) and complex machine learning algorithms for device identification. DFT S OFDM typically leads to high peak-to-average power ratio (PAPR), which imposes linearity and power efficiency trade-off problems in the transmitter.

Aspects and embodiments of the present invention have been devised with the foregoing in mind.

SUMMARY OF THE INVENTION

According to a first aspect of the invention, there is provided a method of encrypting a data signal for providing to an input of a radio frequency transmitter. The data signal may comprise one or more frequency components with a first phase profile in a frequency band of interest. The method may comprise receiving the data signal. The method may further comprise providing an encrypting signal filter comprising one or more frequency components in the frequency band of interest. The encrypting signal filter may be configured to change the first phase profile of the data signal it is applied to. The method may further comprise applying the encrypting signal filter to the data signal to generate an encrypted data signal comprising the one or more frequency components with a second phase profile in the frequency band of interest. The second phase profile may be different to the first phase profile.

The or each frequency component of the data signal may comprise a respective phase. The first phase profile may be a first phase spectrum (in the frequency domain) with a first phase component at the or each frequency in the frequency band of interest. The encrypting signal filter may be configured to introduce distortion to the first phase spectrum or profile of the data signal in the band of interest when applied to the data signal. Applying the encrypting signal filter to the data signal may alter one or more of the first phase component(s) of the data signal in the band of interest such that the encrypted data signal has a different (second) phase spectrum to that of the original data signal. The first phase profile may be substantially linear across the frequency band of interest. The second phase profile may be substantially non-linear. The non-linear second phase profile may be or comprise a profile that is curved, undulating, parabolic, quasi-random, oscillatory and/or noisy. The non-linear second phase profile may be predetermined.

The encrypting signal filter may have a dispersive transfer characteristic in the frequency band of interest. An encrypting signal filter with a dispersive transfer characteristic means a dispersive signal filter or dispersive filter. A dispersive filter means that the frequency component(s) of the filter will spread out in the time domain. As such, the frequency component(s) of the encrypted data signal will spread out in the time domain, e.g. upon transmission of the encrypted baseband signal. The encrypting signal filter may be a first dispersive filter.

The frequency band of interest may define a bandwidth. The bandwidth of the encrypting signal filter may be the same as the bandwidth of the data signal.

The encrypting signal filter or first dispersive filter may be or comprise a first filter kernel. The first filter kernel is or may be or comprise a circuit implemented in the digital domain that has a specific transfer function to alter the phase components of the data signal to which it is applied.

The phase of the or each frequency component of the encrypting signal filter (first dispersive filter) may vary non-linearly across the frequency band of interest. The encrypting signal filter may have a first non-linear phase profile/spectrum across the frequency band of interest. The encrypting signal filter may have a first non-zero and/or non-linear group delay variation across the frequency band of interest. The group delay is the first derivative of the phase spectrum with respect to the frequency. The first non-linear phase variation and/or the first non-linear group delay variation across the frequency band of interest may be or comprise a profile that is curved, undulating, parabolic, quasi-random, oscillatory and/or noisy. The first non-linear phase variation and/or the first non-linear group delay variation may be predetermined.

The step of applying the encrypting signal filter to the data signal may comprise convoluting the data signal with the encrypting signal filter. Alternatively, applying the encrypting filter to the data signal may comprise cross-correlating the data signal with the encrypting signal filter. This step is equivalent to passing the data signal through the encrypting signal filter (filter kernel), which alters or distorts the phase components of the data signal, thereby generating the encrypted data signal.

The data signal may be a modulated baseband signal generated according to a modulation scheme in the frequency band of interest. A baseband signal differs from a raw data signal in its modulation attributes such as phase and amplitude, which are determined by the state of the data signal that is intended to be transmitted. The modulated baseband signal may comprise a series of modulation symbols having a modulation symbol rate and/or a symbol duration. The modulation symbols represent a specific state of a wave (i.e. its phase, amplitude and/or frequency). Each modulation symbol can encode/represent a bit of digital information or a number/group of bits. The modulation scheme may be or comprise quadrature phase shift keying (QPSK), 8 phase shift keying (8PSK), 16 quadrature amplitude modulation (QAM), 16 amplitude and phase-shift keying or asymmetric phase shift keying (APSK), 32 QAM, 32 APSK, 64 QAM, 64 APSK, 256 QAM, 256 APSK, etc. The modulation scheme may be a single carrier or multi-carrier type.

Aspects and/or embodiments of the invention can provide a physical layer encryption scheme that can be applied to the baseband signal, based on introducing a known amount of distortion to the frequency, phase and/or amplitude components of a baseband signal that is transmitted. The encrypting filter (kernel) may be designed and generated with the desired distortion/dispersion properties (transfer function). The encrypting filter (dispersive filter) may be applied to the baseband signal at the front end of the transmitter with unique group delay profiles unknown to the eavesdropper to encrypt the transmitted data signal. An appropriate decrypting filter may then be employed in the authorized receiver(s) to decrypt and recover the original data signal. The group delay profile of the encrypting filter may be unique to the specific pair of nodes communicating over the wireless network.

Aspects and/or embodiments of the invention can effectively conceal the true modulation parameters (i.e. the type of modulation applied to the signal being transmitted, by distorting the phase) of the modulation symbols of the intended modulated radio frequency (RF) signal. The modulation symbols may be represented by complex numbers (through their amplitude and phase), and when plotted in the complex plane (i.e. resolved into phase and amplitude, or real and imaginary parts) the series of discrete modulation symbols form a characteristic symbol constellation pattern, unique to the modulation scheme used.

The modulated baseband signal may have a first modulation symbol constellation, and the encrypted data signal may have a second modulation symbol constellation that is different to the first modulation symbol constellation.

Aspects and/or embodiments of the invention can deliberately introduce constellation distortion to the intended modulated baseband signal to conceal the modulation scheme and generate an encrypted baseband signal.

Aspects and/or embodiments of the invention can thus provide a low complexity viable scheme of encrypting the physical layer in wireless communication equipment. The encryption scheme requires no additional RF power or bandwidth and can be applied to both single carrier and multi-carrier modulation schemes with ease as the encryption at the transmitter and decryption at the receiver only requires convolution operations to be performed to the modulated baseband signal with respective encryption/decryption filters. Additionally, the encryption scheme can be used alongside any of the existing physical layer security techniques to complement their capabilities. Application of the encryption scheme may also be expanded to multiple input and multiple output (MIMO) and carrier aggregated communication schemes with ease.

The step of providing the encrypting signal filter may comprise generating the encrypting signal filter.

Generating the encrypting signal filter may comprise providing a test signal filter comprising one or more frequency components in the frequency band of interest. The one or more frequency components of the test signal filter may comprise a substantially uniform amplitude profile in the frequency band of interest, and/or a substantially linear phase profile in the frequency band of interest. The test signal filter may be or comprise a test filter kernel. The test filter kernel may be or comprise a non-dispersive test filter kernel.

The test signal filter may be or comprise a finite impulse response filter. The test signal filter may be or comprise a truncated sinc function. Optionally or preferably, the truncated sinc function may be or comprise a sinc function multiplied by a window function. The window function may be or comprise any one or more of: a rectangular window, a Hamming window, a Blackman window, a Hanning window, a Hann window, Kaiser window, or a Nuttall window.

Generating the encrypting filter may further comprise transforming the test signal filter from the time domain to the frequency domain to obtain a first filter phase spectrum having a first filter phase component at the or each frequency (of the frequency components of the test signal filter). The first filter phase spectrum may have a first (linear) filter phase profile.

Generating the encrypting signal filter may further comprise determining a first phase offset at the or each frequency (of the frequency components of the test signal filter). The determined first phase offsets may have a maximum phase offset value based at least in part on the width of the frequency band of interest. The maximum phase offset may be a positive or a negative value. The maximum phase offset value may be based at least in part on the width of the frequency band of interest and the modulation symbol rate and/or period. Optionally or preferably, the maximum phase offset value may be based at least in part on the ratio of the width of the frequency band of interest and the symbol rate and/or period.

Generating the encrypting signal filter may further comprise applying, at the or each frequency (of the frequency components of the test signal filter), the determined first phase offset to the respective first filter phase component of the first filter phase spectrum to obtain a second filter phase spectrum having a second filter phase component at the or each frequency. One or more of the second filter phase component(s) may be different to the first filter phase component(s).

The second filter phase spectrum may have a second filter phase profile. The second filter phase profile may be a non-linear phase profile in the frequency band of interest. The non-linear second filter phase profile across the frequency band of interest may be or comprise a profile that is curved, undulating, parabolic, quasi-random, oscillatory and/or noisy. The non-linear second filter phase profile may be predetermined.

Applying the determined phase offset(s) may comprise adding the determined phase offset(s) to the respective first filter phase component(s). Applying the determined phase offsets may introduce a non-linearity to the second filter phase profile across the frequency band of interest. Applying the determined phase offsets may introduce a non-zero and/or non-linear group delay variation across the frequency band of interest.

Generating the encrypting filter may further comprise transforming the transformed test signal filter from the frequency domain to the time domain to obtain the encrypting signal filter.

Transforming the test filter from the time domain to the frequency domain may comprise performing a Fourier transform operation on the test filter. The Fourier transform operation may be or comprise a fast Fourier transform (FFT) operation. Transforming the transformed test filter from the frequency domain to the time domain may comprise performing an inverse Fourier transform operation, e.g. an inverse FFT.

Determining a phase offset at the or each frequency in the frequency band of interest may comprise using a phase offset generator function to output values between zero and the maximum phase offset value. This may comprise inputting, for the or each frequency in the frequency band of interest, a number representative of the respective frequency to the phase offset generator function having the maximum output value.

The phase offset generator function may be a linear, non-linear, oscillatory, parabolic and/or phase randomisation function. For example, the oscillatory function may be a sinusoidal function. The phase offset generator function may be or comprise an elliptical function.

Determining a phase offset at the or each frequency in the frequency band of interest using the phase offset generator function may comprise using a subset of values in a phase encryption key as coefficient values of the phase offset generator function. The phase encryption key may be or comprise a set of prime numbers. The phase encryption key may be a symmetric encryption key determined at a first node comprising the transmitter for encrypting the data signal to be transmitted and a second node comprising a receiver for receiving and decrypting the data signal. The first and second nodes may be legitimate, authentic or authorised nodes. The phase encryption key may be unique to the specific pair (the first and second node) of nodes communicating over the wireless network. The phase encryption key may be generated at each of the first and second node based on a determined frequency response of the signal path between the first and second nodes in the bandwidth of interest. The signal path may comprise or consist of the hardware components in the first and second node and the air-interface between the two nodes.

The determined frequency response of the signal path may comprise a first frequency response of the first node's transmitting hardware, a second frequency response of the second node's transmitting hardware and a third frequency response of the channel between the first and second nodes. The first, second and third frequency responses may be the frequency response to a predefined probe signal. The first, second and third frequency responses may be a frequency dependent impulse response to the stimulus of the predefined probe signal. The determined frequency response of the signal path may be or comprise the convolution of the first, second and third frequency responses. The probe signal may be or comprise a constant envelope signal with a bandwidth equal to or greater than the bandwidth of interest. The probe signal may be or comprise a chirp signal or pulse. The probe signal may have a pulse duration that is substantially shorter than the channel coherence time between the two nodes.

The phase encryption key may be generated at each node based on one or more frequency-domain properties/characteristics of the frequency response of the signal path (determined at each respective node) in the bandwidth of interest. The set of values or prime numbers for the phase encryption key may be derived directly or indirectly from frequency-domain data in the bandwidth of interest. The data may be or comprise the magnitude spectrum of the determined frequency response of the signal path. Each value or prime number in the phase encryption key may be derived directly or indirectly from frequency-domain data in a different frequency region or sub-band, or a different combination of regions or sub-bands, in the frequency bandwidth of interest. The regions or sub-bands may have equal or unequal length in frequency space or an equal/unequal number of data points.

Each value or prime number in the phase encryption key may be derived directly or indirectly from frequency-domain properties including one or more of: a value, an average value, a root mean squared (RMS) value, an integrated value, a gradient/slope, a curvature, and/or a curve-fit coefficient value, of frequency domain data within a, optionally different, frequency region or sub-band in the frequency bandwidth of interest. Each value or prime number in the phase encryption key may be determined by rounding to the nearest integer or prime number.

The one or more frequency-domain properties may be determined by curve fitting (e.g. with a linear or non-linear curve) to at least a portion of the data within each region or sub-band. The one or more frequency dependent properties may be or comprise curve the coefficient values, or a lumped value derived from a plurality of curve coefficient values, of the fitted curve in each region/sub-band.

Alternatively or additionally, each value or prime number in the phase encryption key may be based on one or more prime numbers in the range of frequency bin numbers for each region or sub-band. For example, each prime number in the phase encryption key may be the largest prime number in the range of frequency bin numbers for each region or sub-band. The prime numbers in the phase encryption key may be ordered according to the magnitude of a frequency-domain property of the respective region/sub-band from which the prime numbers derived, such as average value.

Where the data signal is a modulated baseband signal comprising a series of modulation symbols generated according to a modulation scheme, the method may further comprise encrypting the modulation symbols prior to applying the encrypting filter. Encrypting the modulation symbols may comprise adding or subtracting encrypting symbols generated using an encrypting symbol generator function. The adding or subtracting may be performed by modulo-addition or subtraction. The encrypting symbol generator function may be a non-linear function, such as an elliptical function. Using the encrypting symbol generator function may comprise using a subset of values in a symbol encryption key as coefficient values of the encrypting symbol generator function. The symbol encryption key may be or comprise a set of prime numbers. The symbol encryption key may be different to the phase encryption key. The symbol encryption key may be generated at each node based on one or more frequency-domain properties/characteristics of the frequency response of the signal path (determined at each respective node) in the bandwidth of interest, as described above for the phase encryption key.

The method may comprise determining the frequency response of the signal path between the two nodes for generating a/the phase encryption key. Determining the frequency response of the signal path between the two nodes may comprise: transmitting, from the first node at a first time, a first probe signal; receiving, at the second node at a second time, the transmitted first probe signal; transmitting, from the second at a third time, a second probe signal; receiving, at the first node at a fourth time, the transmitted second probe signal; and determining, at respective first and second nodes, the frequency response of the signal path based on the respective received second and first probe signals.

The frequency response of the signal path determined at each node may be substantially the same, and/or be substantially correlated. The frequency response of the signal path determined at each node may comprise a convolution of the first, second and third frequency responses (i.e. the first, second and third frequency-dependent characteristics).

The received first probe signal may comprise the first probe signal convolved with a first frequency response (i.e. a first frequency-dependent characteristic) of the first node's transmitting hardware and a third frequency response (i.e. a third frequency dependent characteristic) of the channel between the first and second nodes. The received second probe signal may comprise the second probe signal convolved with a second frequency response (i.e. a second frequency-dependent characteristic) of the second node's transmitting hardware and a third frequency response (i.e. a third frequency dependent characteristic) of the channel between the first and second nodes.

The first and second probe signals may be transmitted without compensating for the frequency response (i.e. a respective first and second frequency-dependent characteristic) of the transmitting hardware of the first and second nodes, respectively.

The first and second probe signals may be substantially the same. The first and second probe signals may be or comprise a constant envelope signal, such as a chirp signal.

The time interval between the first time and the fourth time may be substantially less than the channel coherence time.

Determining, at the first node, the frequency response of the signal path based on the received second probe signal may comprise convolving the received second probe signal with the first frequency response of the first node's transmitting hardware. The first frequency response may be predetermined by the first node. For example, each node may have a receiver. The receiver in each node can be used to determine the frequency response of its own transmitting hardware (in a similar way to the receiver of the other node). Determining, at the second node, the frequency response of the signal path based on the received first probe signal may comprise convolving the received first probe signal with the second frequency response of the second node's transmitting hardware. The second frequency response may be predetermined by the second node (e.g. as described above). Determining, at respective first and second nodes, the frequency response of the signal path based on the respective received second and first probe signals, may comprise de-convolving the respective second and second probe signal from the respective received second and first probe signals.

According to a second aspect of the invention, there is provided a method of decrypting a data signal encrypted according to the first aspect. The method may comprise receiving the encrypted data signal comprising the one or more frequency components in a frequency band of interest. The method may further comprise providing a decrypting signal filter. The decrypting filter may comprise one or more frequency components in the frequency band of interest (of the data signal). The decrypting signal filter may be configured to change the second phase profile of the encrypted data signal it is applied to. The method may further comprise applying the decrypting signal filter to the encrypted data signal to generate a decrypted data signal comprising the one or more frequency components with a third phase profile, wherein the third phase profile is substantially the same as the first phase profile. The second phase profile may be substantially linear.

The decrypting signal filter may be configured, when applied to the data signal, to substantially remove or reverse the distortion to the first phase spectrum or profile of the data signal that was introduced by the encrypting signal filter (e.g. during encryption). Applying the decrypting signal filter to the data signal may alter one or more of the second phase component(s) of the encrypted data signal in the band of interest, such that the decrypted data signal has a (third) phase spectrum substantially the same as that of the original data signal.

Ideally there should be no difference between the original data signal and the signal recovered after applying the encrypting filter and the decrypting filter. The tolerance limits may depend on the modulation scheme. The tolerance may be substantially 1%, 2%, 3%, 4% or 5% relative to the original data signal, in adherence to the applicable wireless standards.

The bandwidth of the decrypting signal filter may be the same at the bandwidth of the data signal.

The decrypting filter may have a dispersive transfer characteristic in the frequency band of interest. A decrypting filter with a dispersive transfer characteristic means a dispersive filter. The decrypting filter may be a second dispersive filter that is different to the first dispersive filter.

The decrypting filter or second dispersive filter may be or comprise a second filter kernel. The second filter kernel is or may be or comprise a circuit implemented in the digital domain that has a specific transfer function to alter the frequency components of the data signal to which it is applied.

The step of applying the decrypting signal filter to the encrypted data signal may comprise convoluting the encrypted data signal with the decrypting signal filter. Alternatively, applying the decrypting filter to the encrypted data signal may comprise cross-correlating the encrypted data signal with the decrypting filter. This step is equivalent to passing the encrypted data signal through the decrypting signal filter (filter kernel), which alters or distorts the phase components of the encrypted data signal, thereby generating the decrypted data signal.

The phase of the or each frequency component of the decrypting signal filter may vary non-linearly across the frequency band of interest. The decrypting signal filter may have a second non-zero and/or non-linear group delay variation across the frequency band of interest. The second non-zero and/or non-linear group delay variation may be different to the first non-zero/non-linear group delay variation of the encrypting signal filter. The second non-linear phase variation and/or the second non-linear group delay variation across the frequency band of interest may be or comprise a profile that is curved, undulating, parabolic, quasi-random, oscillatory and/or noisy. The second nonlinear phase variation and/or the second non-linear group delay variation may be predetermined.

The step of providing the decrypting signal filter may comprise generating the decrypting signal filter. Generating the decrypting signal filter may comprise providing a test signal filter comprising one or more frequency components in the frequency band of interest. The test signal filter may be the same test signal filter used to generate the encrypting signal filter.

Generating the decrypting signal filter may further comprise transforming the test signal filter from the time domain to the frequency domain to obtain a first filter phase spectrum having a first filter phase component at the or each frequency.

Generating the decrypting signal filter may further comprise determining a second phase offset at the or each frequency. The second phase offset(s) may be different to the first phase offset(s) used to generate the encrypting signal filter. The second phase offset(s) may be determined by inverting the first phase offset(s) used to generate the encrypting signal filter. Inverting the second phase component(s) nullifies the phase offset added/introduced during encryption. For example, if a particular phase component was offset by +30 degrees for encryption, it must to be offset by −30 degrees for decryption.

Generating the decrypting signal filter may further comprise applying, at the or each frequency, the determined second phase offset(s) to the respective first filter phase component of the first filter phase spectrum to obtain a third filter phase spectrum having a second third phase component at the or each frequency, the third filter phase component(s) being different to the first phase component(s).

The third filter phase spectrum may have a third phase profile that is different to the second filter phase profile. The third filter phase profile may be a non-linear phase profile in the frequency band of interest. The non-linear third filter phase profile across the frequency band of interest may be or comprise a profile that is curved, undulating, parabolic, quasi-random, oscillatory and/or noisy. The non-linear third filter phase profile may be predetermined.

Applying the determined second phase offset(s) may comprise adding the determined second phase offset(s) to the respective first filter phase component of the first filter phase spectrum.

Generating the decrypting signal filter may further comprise transforming the transformed test filter from the frequency domain to the time domain to obtain a decrypting signal filter.

Where the data signal is a modulated baseband signal comprising a series of modulation symbols generated according to a modulation scheme, the modulated baseband signal may have a first modulation symbol constellation, the encrypted data signal may have a second modulation symbol constellation that is different to the first, and the decrypted data signal may have a third modulation symbol constellation that is substantially the same as the first modulation symbol constellation.

Where the data signal is a modulated baseband signal comprising a series of modulation symbols generated according to a modulation scheme, and the modulation symbols where encrypted prior to applying the encrypting filter, the method may comprise decrypting the modulation symbols after applying the decrypting filter by adding or subtracting the encrypting symbols generated using an encrypting symbol generator function, as described in the first aspect, to recover the original modulation symbols (e.g. if encrypting symbols were added when the signal was transmitted, these will need to be subtracted to decrypt the symbols). The adding or subtracting may be performed by modulo-addition or subtraction. Note that the raw data bits that the symbol represent may already be encrypted by the higher layers in the network stack. The proposed method encrypts/decrypts the symbols (i.e. in addition to any data encryption on the input bits).

The methods of the first and second aspect can be adapted for applying to multi-carrier signals, such as orthogonal frequency division multiplexing (OFDM) signals.

A multi-carrier data signal may comprise a plurality of subcarrier signals. Each subcarrier signal may be or comprise a narrow frequency bandwidth signal with a different subcarrier frequency. Each subcarrier frequency may be orthogonally spaced. In the time-domain, each subcarrier signal may be or comprise a sinusoidal signal. In the frequency-domain, each subcarrier signal may be or comprise a sinc-function, a sinc-like function, a truncated sinc-function or a finite impulse response filter. Each subcarrier signal may comprise a central or peak frequency, amplitude and phase. The amplitude and/or phase of each subcarrier may be modulated in the frequency domain using modulation symbols of a modulation scheme. Each subcarrier may be mapped to one symbol or vice versa. The modulated frequency domain subcarriers may be transformed to the time-domain to produce a wide bandwidth (composite) data signal (i.e. equivalent to the baseband signal in the single carrier case).

According to third aspect, there is provided a method of encrypting a multi-carrier data signal comprising a plurality of subcarrier signals for providing to an input of a radio frequency transmitter. The method may comprise receiving a sequence of first modulation symbols. The method may comprise receiving an input bit sequence and mapping it to a sequence of first modulation symbols according to a modulation scheme. The sequence of first symbols may be or represent a sequence of first subcarrier signals of the multi-carrier data signal. Each first modulation symbol may be or comprise a complex number/value representing a (mapped) modulation constellation point, i.e. a specific amplitude and phase (of the corresponding subcarrier signal). Each first modulation symbol may comprise, specify or represent a first phase and first amplitude (of the corresponding subcarrier signal). Each first modulation symbol may be assigned or mapped to a different subcarrier frequency. Alternatively, the method may comprise receiving a sequence of first subcarrier signals, each first subcarrier signal having a first phase and first amplitude. Each first subcarrier signal may have, be assigned, or be mapped to a different subcarrier frequency. The method may comprise applying (e.g. adding or subtracting, in the frequency domain) a first (or encrypting) phase offset to the first phase of each first modulation symbol or each first subcarrier signal to obtain a sequence of second modulation symbols or a sequence of second subcarrier signals, with each second modulation symbol or each second subcarrier signal having a second phase different to the first phase. This essentially randomised the phases and conceals the modulation constellation. The method may comprise transforming the sequence of second modulation symbols or the sequence of second subcarrier signals from the frequency domain to the time domain to obtain an encrypted data signal. This may comprise performing an inverse Fourier transform operation, such as an inverse FFT.

The first (encrypting) phase offsets may be determined as described in the first aspect. In this case, each frequency component in the frequency band of interest in the first aspect corresponds to a respective subcarrier frequency.

The method may further comprise encrypting the sequence of first modulation symbols or first carrier signals to generate a sequence of encrypted modulation symbols or encrypted carrier signals, prior to applying the first phase offsets. This essentially scrambles or randomises the original input data encoded in the sequence. In this case, the first phase offsets may then be applied to the phase of each encrypted modulation symbol or encrypted carrier signal. Encrypting the sequence of first modulation symbols or first carrier signals may comprise adding or subtracting encrypting symbols, as described in the first aspect.

According to a fourth aspect, there is provided a method of decrypting a multi-carrier data signal encrypted according to the third aspect. The method may comprise receiving the encrypted data signal. The method may further comprise transforming the encrypted data signal from the time domain to the frequency domain to obtain a sequence of third modulation symbols, or a sequence of third subcarrier signals. This may comprise performing a Fourier transform operation, such as an FFT. Each third modulation symbol may comprise, specify or represent a third phase and third amplitude (of the corresponding subcarrier signal). Each third carrier signal may have a third phase and third amplitude. The sequence of third modulation symbols or the sequence of third subcarrier signals may be substantially the same as the sequence of second modulation symbols or the sequence of second subcarrier signals. The method may further comprise applying (e.g. adding or subtracting, in the frequency domain) a second (or decrypting) phase offset to the third phase of each third modulation symbol or third subcarrier signal to obtain a sequence of fourth modulation symbols or a sequence of fourth subcarrier signals, with each fourth modulation symbol or fourth subcarrier signal having a fourth phase different to the third phase. The sequence of fourth modulation symbols or the sequence of fourth subcarrier signals may be substantially the same as the sequence of first modulation symbols or the sequence of first subcarrier signals.

The second (decrypting) phase offsets may be determined as described in the second aspect. In this case, each frequency component in the frequency band of interest in the first aspect corresponds to a respective subcarrier frequency. Where the sequence of first modulation symbols or first subcarrier signals was encrypted, the method may further comprise decrypting the sequence of fourth modulation symbols or fourth carrier signals to generate a sequence of decrypted modulation symbols or decrypted carrier signals that are substantially the same as the sequence of first modulation symbols or the sequence of first subcarrier signals. This essentially unscrambles or recovers the original input data encoded in the sequence. Decrypting the sequence of fourth modulation symbols or fourth carrier signals may comprise adding or subtracting encrypting symbols, as described in the second aspect (e.g. if encrypting symbols were added when the signal was transmitted, these will need to be subtracted to decrypt the symbols).

"Substantially the same" means, in this context, the Error Vector Magnitude (EVM) of the decrypted signal should adhere to the relevant modulation standard which defines the allowable extent of variation.

Features which are described in the context of separate aspects and embodiments of the invention may be used together and/or be interchangeable. Similarly, where features are, for brevity, described in the context of a single embodiment, these may also be provided separately or in any suitable sub-combination.

BRIEF DESCRIPTION OF DRAWINGS

In order that the invention can be well understood, embodiments will now be discussed by way of example only with reference to the accompanying drawings, in which.

Figure 1:
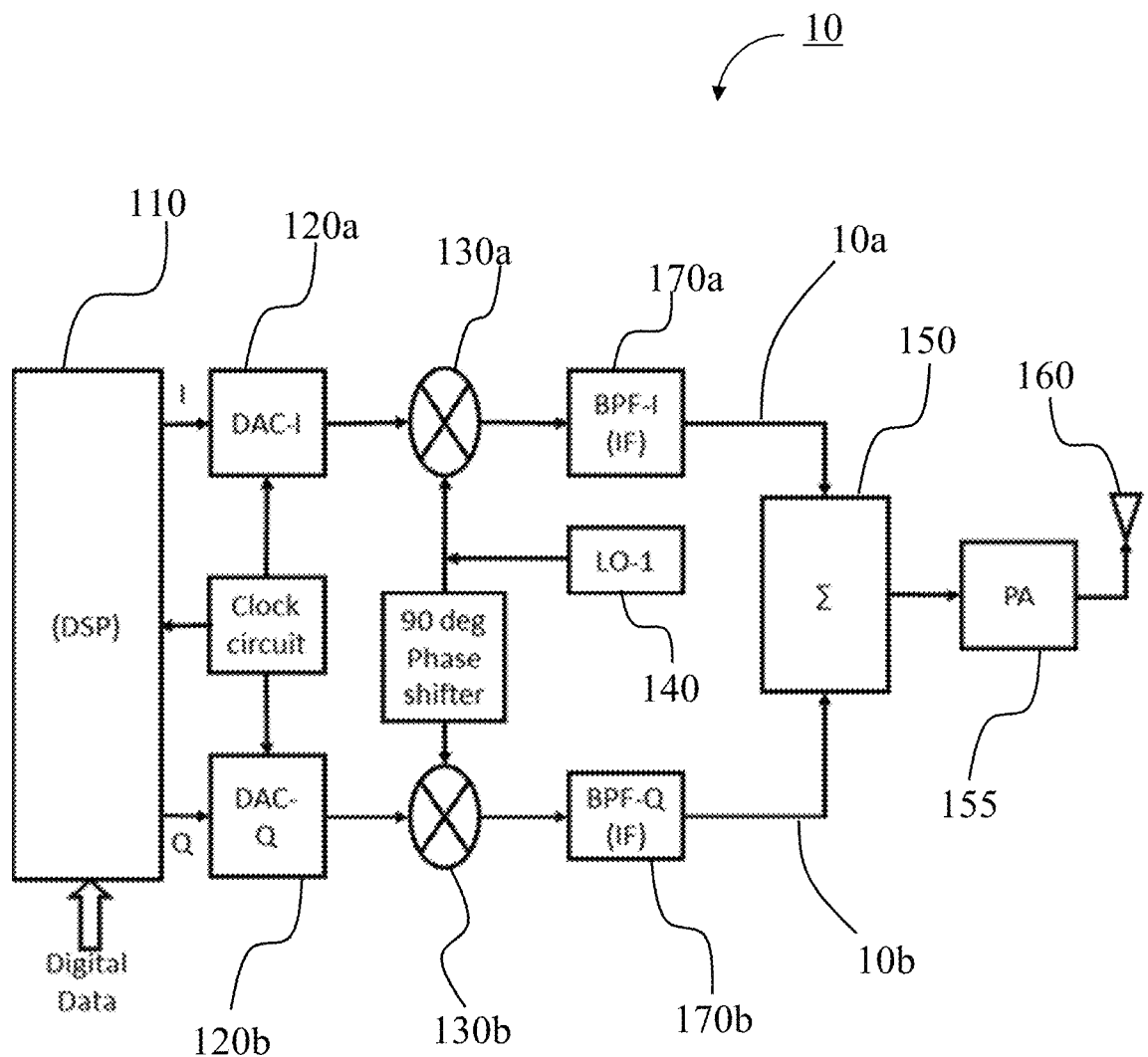
FIG. 1 shows a generalised block diagram of a wireless transmitter.

It should be noted that the figures are diagrammatic and may not be drawn to scale. Relative dimensions and proportions of parts of these figures may have been shown exaggerated or reduced in size, for the sake of clarity and convenience in the drawings. The same reference signs are generally used to refer to corresponding or similar features in modified and/or different embodiments.

DETAILED DESCRIPTION

FIG. 1 shows a generalised block diagram of a typical wireless transmitter 10 with two parallel signal processing paths 10a, 10b. The transmitter 10 comprises a digital signal processor (DSP) 110 configured to generate a digital baseband signal in response to input digital data intended to be transmitted. The digital baseband signal comprises a series of modulation symbols that represent a specific state of a wave (i.e. its phase, amplitude and/or frequency). Each modulation symbol can represent a bit of digital information or a number/group of bits.

The baseband signal is a wideband signal. The range of frequencies occupied by the baseband signal (i.e. the bandwidth) is proportional to the rate of change of the modulation symbols per second, which is in turn proportional to the rate of change of bits per second, which can be large. For example, an ideal wireless transmission system where the input bits change at a rate of 200 megabits per second (Mbps) and employing a quadrature phase shift keying (QPSK) modulation scheme (where each modulation symbol represents two bits) requires a bandwidth of 100 MHz.

The digital baseband signal is provided to a pair of digital to analogue converters (DACs) 120a, 120b to generate equivalent analogue baseband signals at a frequency $f_b$. The analogue baseband signals are up-converted to a higher (radio frequency, RF) carrier frequency ($f_c$) by means of a local oscillator (LO) 140 and mixers 130a, 130b. The mixer 130a, 130b acts as a signal multiplier which multiplies the analogue baseband signal with a sinusoidal signal generated by the LO at a LO frequency ($f_{LO}$). This operation performs a frequency translation of the baseband signal to the carrier frequency $f_c$. Each signal path 10a, 10b may further comprise a band pass filter 170a, 170b. The up-converted signals are then combined at a combiner 150 to form the modulated carrier signal with the encoded digital data. The modulated carrier signal changes its state according to each successive modulation symbol. The carrier signal may be further amplified and filtered through components 155, and transmitted through an antenna 160. The transmitted carrier signal may then be received by a receiver (not shown) where it is down-converted and the baseband signal demodulated to extract the data.

The digitally generated modulation symbols may also be represented in the form of complex numbers having a real and imaginary component. The real part of the complex number is designated as the in-phase (I) component of the waveform and the imaginary part of the complex number is designated the quadrature (Q) component (i.e. out of phase). The I and Q components of the modulation symbols are orthogonal to each other, i.e. they exhibit a 90 degree phase difference. Separation of the modulation symbols into I and Q components is known as IQ modulation, and is an effective and widely used way to transfer digital information.

Referring to FIG. 1, the two signal paths correspond to an I baseband channel and a Q baseband channel. In one example, the DSP 110 sends the I component of the digital baseband signal to DAC 130a and the Q component of the digital baseband signal to DAC 130b. The I and Q components of the digital baseband signal are then converted to equivalent analogue I and Q baseband signals at the DACs 130a, 130b. The respective phases of the sinusoidal signals generated by the LO that up-convert the I and Q baseband signals are also in quadrature i.e. phase shifted by 90 degrees.

The number of different modulation symbols used in the baseband signal depends on the number of bits encoded by each symbol, which depends on the modulation scheme used. For example, in a general quadrature phase shift keying (QPSK) modulation scheme, every two bits of input digital data are mapped to one complex valued symbol with the four possible symbols 00, 01, 10, 11. Each of these symbols is represented by a magnitude, phase and complex number as shown in the table below. The complex valued symbols thus also referred to as vector modulation symbols.

| Bit Pattern/<br>Symbol | Magnitude | Phase/<br>Angle in<br>degrees | Complex<br>representation | Real<br>Part<br>(I) | Imaginary<br>(Q) |
|---|---|---|---|---|---|
| 00 | 1 | 45 | 1 + j1 | 1 | 1 |
| 01 | 1 | 135 | −1 + j1 | −1 | 1 |
| 11 | 1 | 225 | −1 − j1 | −1 | −1 |
| 10 | 1 | 315 | 1 − j1 | 1 | −1 |

Another example modulation scheme is an 8PSK scheme in which every three bits of input digital data are mapped to one complex valued symbol with the eight possible symbols 000, 100, 110, 111, 011, 001, 101, 010 and phase angles 22.5°, 67.5°, 112.5°, 157.5°, 202.5°, 247.5°, 292.5°, 337.5°.

Figure 4A:
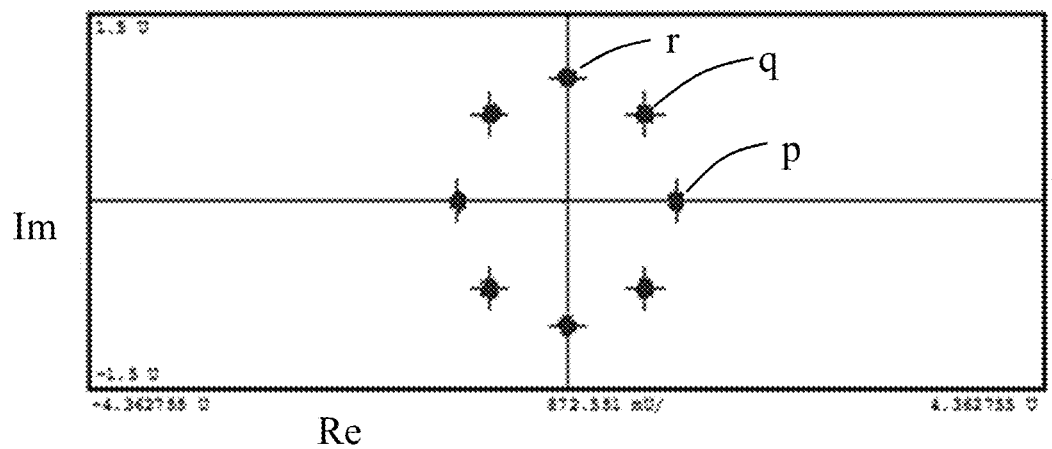
FIGS. 4a-4c show complex plane plots of the symbol constellation of a modulated baseband signal before encryption, after encryption, and after subsequent decryption, respectively.

When the baseband signal is plotted in the complex plane (i.e. resolved into phase and amplitude, or real and imaginary parts) the series of discrete modulation symbols form a characteristic symbol constellation pattern, unique to the modulation scheme used. For example, the QPSK scheme has a constellation of four points, with each symbol being 90° away from an adjacent symbol, and the 8PSK scheme has a constellation of eight points, with each symbol being 45° away from an adjacent symbol. An example 8PSK constellation plot is shown in FIG. 4a, where symbols 000, 100 and 110 labelled p, q and r, respectively.

A receiver (not shown) can readily demodulate the baseband signal with knowledge of the modulation scheme to recover the raw digital data. The receiver determines the phase of the received signal segment and maps it back to the symbol it represents to recover the original digital input data. The digital data input to the transmitter 10 is typically already encrypted or encoded according to any of the known security protocols defined in the upper layers of the network protocol stack, such as the data link layer, e.g. using techniques such as scrambling and shared data encryption keys. However, these encryption schemes do not secure the air interface parameters such as the modulation symbols and leave them susceptible to eavesdropping and interception by man-in-the-middle platforms. For example, even without knowledge of the modulation scheme, the baseband signal can be demodulated, essentially by comparing the location of a received symbol against all known ideal symbols in all known constellations to find the closest match. This allows unauthorised devices (e.g. access points) to intercept and recover the digital data and attempt to decrypt it.

In an embodiment of the invention, there is provided a method of encrypting and decrypting a modulated digital baseband signal to conceal the symbol constellation and make it indistinguishable from any known constellation pattern. In this way, unauthorised devices that attempt to intercept the transmitted carrier signal will not be able to demodulate the baseband signal. The method achieves this by introducing a known amount of distortion to the constellation pattern in the transmitted carrier signal that can only by removed by using a "decryption key" at the receiver end, known only to authorised nodes.

The method leverages one of the key parameters that effects the integrity of the modulation symbols transmitted, namely the group delay variation (GDV) over the bandwidth of interest. The GD is defined as the rate of change of phase with angular frequency, according to:

$$GD = \frac{d\varphi}{d\omega} \tag{1}$$

where GD is the group delay in seconds, φ is the phase in radians and ω is the angular frequency in radians/second. The GD is parameter that relates to the amount of dispersion of the individual frequency components that make up the spectrum of the modulated baseband signal.

The GD is a key parameter that is considered in the selection of RF components and front end filters, and is ideally constant over the band of interest. For example, the hardware involved in the generation of the wideband modulated carrier signal often requires calibration to mitigate the bandwidth specific impairments such as ripple, tilt, and non-linear GDV. These are caused by critical blocks in a transmitter 10 such as the DACs 120a, 120b, mixers 130a, 130b, band pass filters 170a, 170b and amplifiers 155, whose non-uniform amplitude and phase responses over the bandwidth of interest need to be compensated to maintain the integrity of the modulated carrier signal. In addition, with IQ modulation it is critical to maintain the phase difference (90 degrees) between the I and Q components throughout the transmit chain in order to maintain the integrity of the encoded data. It is therefore necessary to characterise/calibrate the frequency response of each stage of the transmitter over the frequency range of interest to compensate for any amplitude and/or phase variations that the signals undergo along each signal path.

The method proposed herein exploits the effects of the GD parameter to distort the baseband signal and associated symbol constellation. The baseband signal is a wideband signal comprising one or more frequency components with a first phase profile in a frequency band of interest. The method of encrypting the baseband signal comprises providing an encrypting signal filter (i.e. encrypting filter) having a first non-zero and non-linear GDV over the frequency band of interest, and convolving the baseband signal with the encrypting filter to generate an encrypted baseband signal comprising the one or more frequency components, but now with a second phase profile in the frequency band of interest. The method of decrypting comprises providing a decrypting signal filter (i.e. decrypting filter) having a second non-zero and non-linear GDV over the frequency band of interest, and convolving the encrypted data signal with the decrypting filter to reverse the distortion introduced by the encrypting filter and recover substantially the original data signal.

The modulation symbols generated initially represent high modulation rate digital pulses that are shaped/filtered with a pulse shaping filter to limit the bandwidth and reduce inter-symbol interference that may be caused by the transmission along the (bandwidth-limited) channels 10a, 10b of the transmitter 10. The modulation symbol generation, wave shaping and baseband filtering operations are handled by the DSP 110 in most modern transmitters 10. The wave shaping filter itself must not introduce inter-symbol interference. Finite impulse response (FIR) filters are preferred in the area of digital baseband filtering due to the flexibility available in shaping the spectral characteristics. FIR filter functions or kernels are usually designed to exhibit a near flat amplitude response and a linear phase response over the bandwidth of interest. In other words, an ideal FIR filter kernel excites the whole band of the desired frequencies with the same amplitude and maintains a predetermined phase across the band of interest (i.e. an ideal FIR filter kernel has a substantially zero GDV).

An example FIR filter kernel that meets this criterion is a truncated sinc pulse. A truncated sinc pulse can be obtained by multiplying the sinc function by a window function. An example truncated sinc pulse is obtained using the Hamming window, and is given by the kernel:

$$h(n) = \sin\frac{\left(2\pi f_{cut}\left(n - \frac{M}{2}\right)\right)}{\left(n - \frac{M}{2}\right)} * \left(0.54 - 0.46 * \left(\cos\left(2\pi\frac{n}{M}\right)\right)\right) \quad (1)$$

where, M is the total number of samples, n is the sample number ranging from 0 to M, and $f_{cut}$ is the cut-off frequency. The duration or length (in time) of the sinc pulse is $MT_s$ where $T_s$ is the sample interval. The bandwidth of the sinc-pulse is $2f_{cut}$. In equation 1, the first term on the right hand side is the sinc function and the second term is the Hamming window.

Figure 2A:
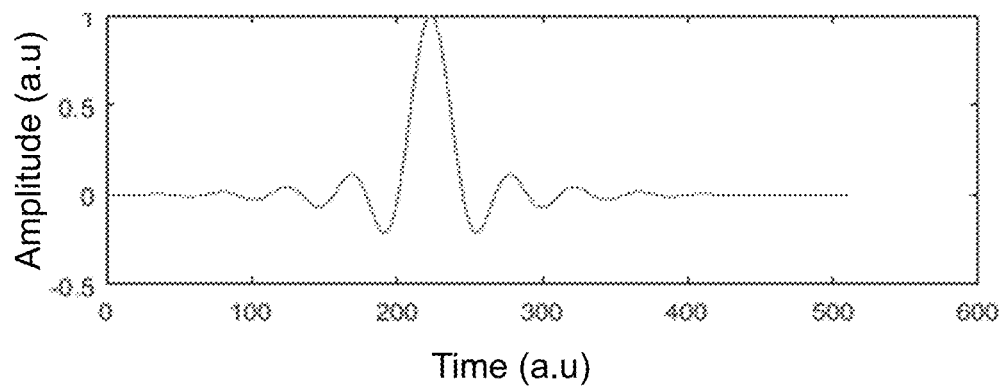
FIG. 2a shows an example wide bandwidth test signal filter.
Figure 2B:
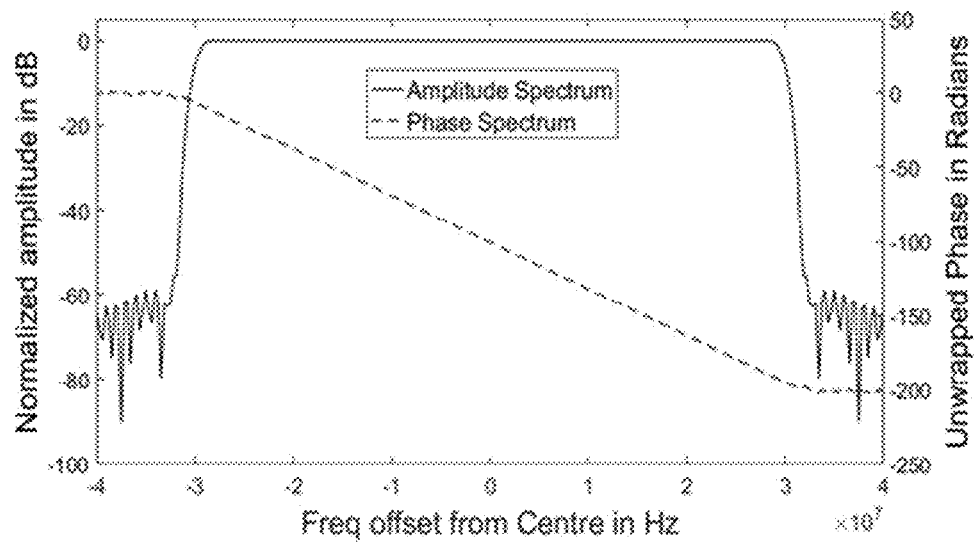
FIG. 2b shows the magnitude and phase spectra of the test signal filter of FIG. 2.

FIG. 2a shows an example FIR filter kernel in the time domain generated using equation 1. FIG. 2b shows the corresponding magnitude/amplitude (solid line) and phase (dashed line) response in the frequency domain obtained from the fast Fourier transform (FFT) of the FIR filter kernel shown in FIG. 2 (offset with respect to the centre frequency). The bandwidth of the test signal shown in FIGS. 2a and 2b is approximately 60 MHz. A characteristic of the truncated sinc pulse is a substantially linear phase response in the frequency domain (see FIG. 2b).

The length of the truncated sinc pulse depends on the transition bandwidth of the truncation window function from the pass band to stop band, i.e. it depends on the slope of the tapers at the band edges in the frequency domain. Longer input test signals are required for window functions with sharper profiles, i.e. smaller tapers. This also affects the Peak to Average Power Ratio of the input test signal.

A linear phase response in the band of interest implies a constant GD (i.e. zero GDV). For example, this could be verified by taking the first derivative of the phase response of FIG. 2b with respect to frequency, which would yield a substantially flat line of constant value (equal to the gradient or GD) in the frequency band of interest. A constant GD means the filter kernel is non-dispersive. In other words, all the frequency components of the symbols shaped with such a filter kernel will not spread out in the time domain when transmitted through a channel 10a, 10b (i.e. experience the same time lag), and the integrity of the symbol constellation will be maintained.

Conversely, a filter kernel with a non-linear phase response yields a non-linear GDV which will be dispersive. Such a dispersive filter kernel will cause the frequency components of the symbols shaped with such a filter kernel to spread out in the time domain causing inter-symbol interference and distortion to the symbol constellation. Constellation distortion makes it difficult to distinguish different symbols and thus increases the bit error rate (BER). Consequently, traditionally non-zero and non-linear GDV in baseband signals is actively avoided to reduce BER.

In contrast, the invention seeks to actively introduce a predetermined amount and form of non-zero and non-linear GDV across the frequency band of interest to conceal the symbol constellation of the transmitted signal.

Figure 3:
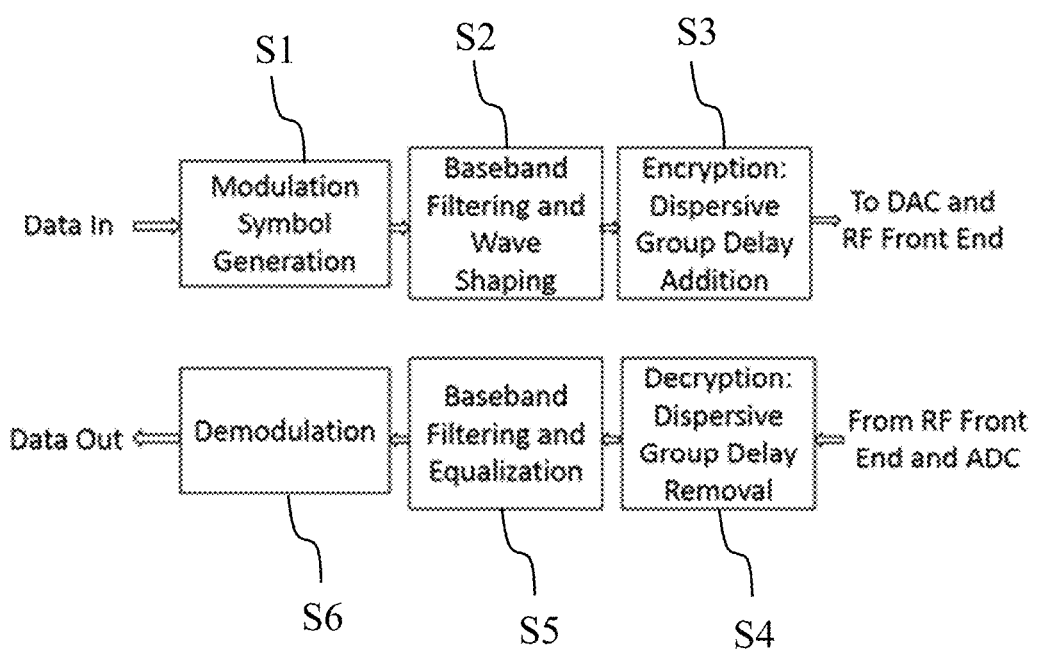
FIG. 3 shows a general method of encryption and decryption according to the invention.

The general method of encryption and decryption is shown in FIG. 3. In step S1, the modulation symbols are generated (e.g. by the DSP 110) to form a digital baseband signal. In step S2, the digital baseband is shaped and filtered with a FIR filter (such as that in equation 1) to define a bandwidth.

In step S3, the baseband signal is convolved with a dispersive encrypting filter kernel to generate an encrypted baseband signal. The encrypting filter kernel is has a bandwidth equal to the bandwidth of the baseband signal. The dispersive encryption filter kernel is configured to add a non-zero and non-linear GDV to the baseband signal in the frequency band of interest.

Steps S1-S3 may be performed in the DSP 110 of the transmitter 10. The encrypted baseband signal is then sent to the DACs 120a, 120b and RF front end of the transmitter 10 where it is up-converted to the carrier frequency for transmission. Due to the non-zero GDV introduced by the decrypting filter kernel, during transmission through the channels 10a, 10b of the transmitter 10, the frequency components of the baseband signal will spread in the time domain causing inter-symbol interference which distorts the symbol constellation and conceals the true symbols.

In step S4, a dispersive decrypting filter kernel is convolved with the baseband signal received at the receiver after down-conversion and analogue-to-digital conversion. The decrypting filter kernel also has a bandwidth equal to the bandwidth of the baseband signal. The dispersive decryption filter is configured to remove the non-zero GDV added by the encrypting filter kernel to recover the true modulation symbols. In steps S5 and S6 the baseband signal is demodulated and the data retrieved. Steps S4-S6 may be performed in the DSP of the receiver (not shown).

Alternatively, the encrypting (decrypting) filter kernel may be cross-correlated with the baseband (encrypted baseband) signal.

According to an embodiment of the invention, the encrypting and decrypting filter kernels are specifically designed and generated to have a bandwidth equal to the bandwidth of the baseband signal, and a predetermined non-zero and non-linear GDV across the frequency band of interest. The non-zero and non-linear GDV may be unique and/or known only to authorised parties, allowing the encryption/decryption filter kernels to be customisable and application specific. The desired encrypting and decrypting filter kernels can be generated by modifying the spectral components of a (non-dispersive) test filter kernel, such as the FIR filter kernel of equation 1.

The general method of generating the encrypting filter kernel comprises: (i) transforming the (test) FIR filter kernel having the desired bandwidth from the time domain to the frequency domain to obtain its phase spectrum and amplitude spectrum; (ii) adding a predetermined first phase offset to each frequency component of the phase spectrum in the band of interest to produce a first modified phase spectrum with a first non-linear phase variation across the band of interest; and (iii) transforming the modified (test) FIR filter kernel from the time domain to the frequency domain to obtain an (dispersive) encrypting filter kernel with a first non-zero and non-linear GDV in the frequency band of interest.

The decrypting filter is generated by substituting steps (ii)-(iii) with: (iib) adding a predetermined second phase offset to each frequency component of the phase spectrum in the band of interest to produce a second modified phase spectrum with a second non-linear phase variation across the band of interest, where the second phase offsets are determined by inverting the first phase offsets; and (iiib) transforming the modified (test) FIR filter kernel from the time domain to the frequency domain to obtain a (dispersive) decrypting filter with a second non-zero and non-linear GDV in the frequency band of interest.

Non-zero, linear and non-linear (e.g. parabolic, oscillatory, ripples or quasi-random) GDV may be used to introduce distortion to the phase components and conceal the modulation scheme. However, linear GDV may be predicted and estimated to break the encryption in multi-carrier schemes like OFDM. For example, taking the second derivative of phase may predict the linear GDV. Therefore, non-zero and non-linear GDV is preferable for secure encryption. In addition, a minimum level or amplitude of GDV across the band of interest is required to introduce significant symbol/constellation distortion (i.e. symbol displacement in the constellation plot) to the encrypted baseband signal. As such, the non-linear phase variation introduced by the phase offsets must have a peak variation $\Delta\phi_{max}$ sufficient to meet the minimum GDV criterion across the band of interest.

Simulation results in A. Azizzadeh and L. Mohammadi in "Degradation of BER by Group Delay in Digital Phase Modulation" Fourth Advanced International Conference on Telecommunications, 2008, indicate that a significant amount of constellation distortion is introduced in a QPSK carrier signal if a the GDV is greater than the symbol duration $T_s$ by at least a factor 1.15 for a parabolic GDV (i.e. GDV/$T_s \geq 1.15$), and GDV/$T_s \geq 0.43$ for a linear GDV.

The maximum phase offset $\Delta\phi_{max}$ required can be determined through the relation:

$$|\Delta\phi_{max}| \geq BW*X*T_s \qquad (2)$$

where X is the minimum GDV/$T_s$ ratio required to introduce significant symbol constellation distortion (e.g. 1.15 for a parabolic GDV). Equation 2 is derived from equation 1 by equating d$\phi$ to the bandwidth of interest, BW. $\Delta\phi_{max}$ can be positive or negative.

The phase and amplitude spectra of the FIR filter kernel can be obtained from its fast Fourier transform (FFT). The result of the FFT is a phase and amplitude spectrum with a discrete number of points in the frequency band of interest. Phase offsets are applied to each frequency component of FFT phase spectra in the frequency band of interest to obtain a modified FFT phase spectrum.

In an embodiment, the phase offsets are determined by inputting numbers representing each frequency in the FFT phase spectrum in the frequency band of interest into a phase offset generating function, which outputs phase offsets between zero and a maximum value set to $\Delta\phi_{max}$. An example phase offset generating function is the cosine curve:

$$\Delta\phi(n) = \Delta\phi_{max} \cos\left(\frac{2\pi n}{N}\right) \qquad (3)$$

where N is the number of frequency components in the FFT phase spectrum in the band of interest, and n in an integer ranging from 0 to N. In this example, the period of the cosine curve is equal to the number N. However, it will be appreciated that the period may be less than or greater than N. In an embodiment, the period of the cosine curve is chosen to be rational fractions of N, e.g. N/2, N/3, 2N/3 etc. A phase shift may be added to the function of equation 3 to change the initial phase offset value (e.g. to a value less than $\Delta\phi_{max}$). In addition, the phase shift may be changed randomly at predetermined intervals, e.g. in accordance with an agreed and predetermined pseudo-random hop sequence generated using the location of network nodes and RF fingerprint techniques.

It will be appreciated that any linear, or non-linear, parabolic or oscillatory function may be used, provided it outputs a maximum phase offset according to equation 2 across the band of interest. Alternatively, a phase randomisation function may be used to provide a random phase offset variation and therefore random GDV across the frequency band of interest.

The number of points N occupied by the frequency band of interest in the FFT phase spectra can be determined by the sampling rate of the FIR filter kernel and the length of the FFT plot (i.e. the number of frequency FFT bins). For example, if the FIR filter kernel with a bandwidth of interest of 35 MHz is generated digitally at a sample rate of 160 MHz and the number of frequency bins chosen for the FFT is 512, the frequency per bin is 312.5 kHz and the number N of FFT bins occupied by the frequency band of interest is 112. Since the FFT is a two-sided spectrum, half of the frequency components of the FIR filter kernel occupy bins 1 to 56 and the other half occupy bins 457 to 512 to give the total band width (the maximum frequency in the lower half of the FFT spectrum, i.e. at bin 256 is 80 MHz.

Once the first phase offsets are determined (e.g. through equation 3) and added to the respective phase components of the FFT phase spectrum of the (test) FIR filter kernel to obtain the first modified FFT phase spectrum, the encrypting filter can be obtained by performing an inverse FFT on the first modified FFT spectra.

Similarly, once the second phase offsets are determined (e.g. by inverting the first phase offsets) and added to the respective phase components of the FFT phase spectrum of the (test) FIR filter kernel to obtain the second modified FFT phase spectrum, the decrypting filter can be obtained by obtaining the inverse FFT of the second modified FFT spectra.

The above described encryption and decryption scheme was experimentally validated in hardware. An 8PSK baseband signal was generated in accordance with the digital television broadcast standard (DVB-S2) at a symbol rate of 40 Msps (mega symbols per second), and shaped with a root raised cosine (RRC) FIR filter having a roll off factor α of 0.2 resulting in a bandwidth of 48 MHz. A dispersive encrypting and decrypting filter was generated using equations 1 and 3 according to the method described above with a maximum phase offset $\Delta\phi_{max}$ of 10 radians (taking X=1.15). The encrypting filter was convolved with the 8PSK modulated baseband signal to generate an encrypted baseband signal to cause symbol constellation distortion and conceal the modulation scheme. The in-phase and quadrature parts of the resulting encrypted baseband signal were quantised into discrete digital values and applied to the input channels 1 and 2 of a DAC (Texas Instruments 34SH84) to generate the analogue equivalent encrypted baseband signals. These analogue encrypted baseband signals were up-converted to Ku band at a carrier frequency $f_c$=14.23 GHz. The RF front end, including DAC and the Ku band up-converter are calibrated to mitigate the effects of parasitic amplitude ripple and tilt, group delay and IQ imbalance over the frequency band of interest. A vector signal analyzer (VSA) made by Rohde and Schwarz was used as the reference receiver to demodulate the Ku band carrier signal and observe the symbol constellation pattern.

FIG. 4a shows a complex plane plot of the symbol constellation of the demodulated baseband signal before the encryption method was applied. A characteristic constellation pattern of the eight well-resolved 8PSK symbols is observed, three of which are labelled p, q. r, each adjacent symbol separated by a well-defined 45° phase shift. The error vector magnitude displayed by the instrument was 4.8%.

Figure 4B:
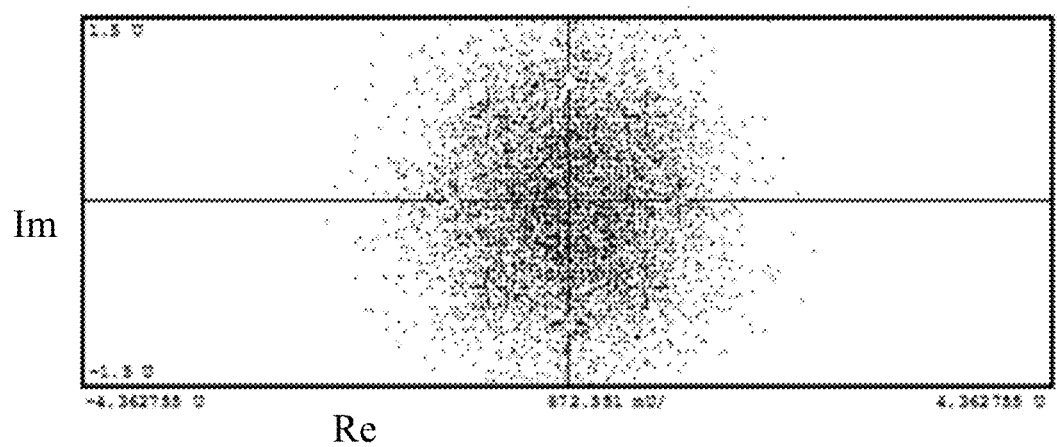

FIG. 4b shows the corresponding symbol constellation plot of the demodulated encrypted baseband signal, i.e. after the encrypting filter was applied at the transmitter end. The symbol constellation is substantially distorted and cannot be identified. In this example, the VSA instrument is not able to lock on to encrypted base band signal to identify the symbols and hence displays noise. The plot shows that the amplitude and phase of each symbol in the encrypted baseband signal is no longer maintained across the air-interface, but is substantially altered and the modulation scheme is effectively concealed.

Figure 4C:
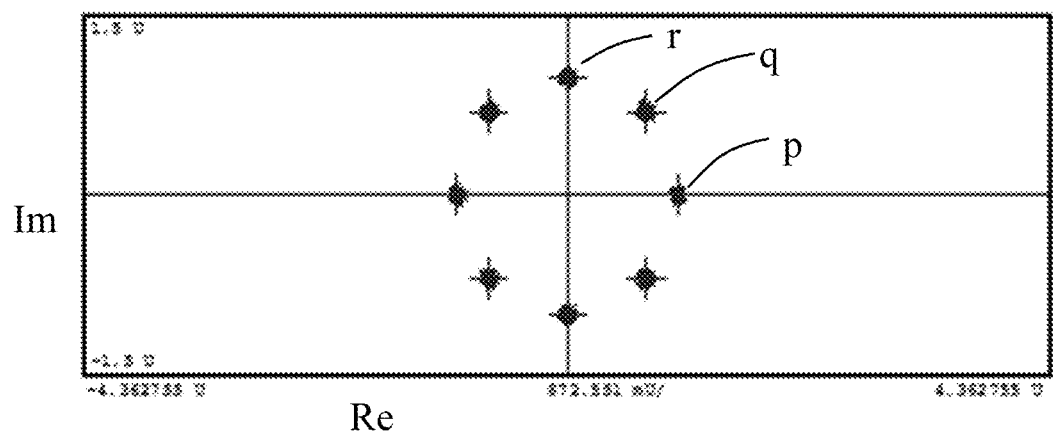

FIG. 4c shows the corresponding symbol constellation plot of the demodulated decrypted baseband signal, i.e. after the decrypting filter was applied at the receiver end to the encrypted baseband. The characteristic 8PSK constellation pattern is again clearly observed, with each symbol separated by a well-defined 45° phase shift. The error vector magnitude displayed by the instrument was 4.9%. This plot clearly demonstrates that the original baseband signal and symbols can be recovered by an authorised receiver that knows the correct decrypting filter to apply.

Figure 5:
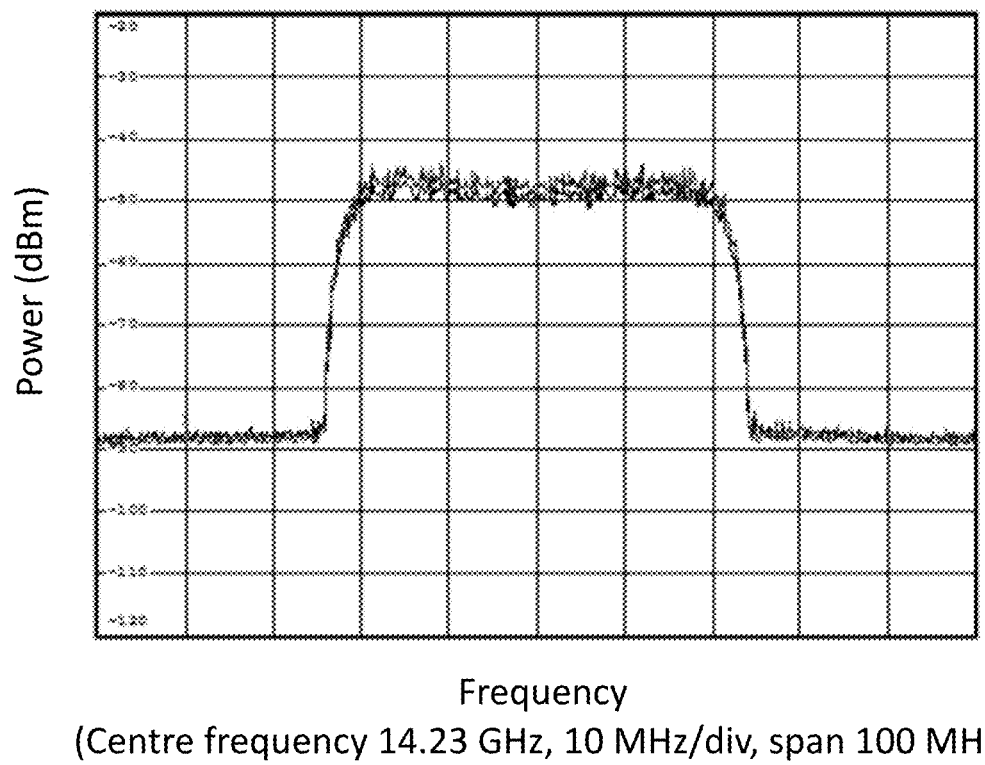
FIG. 5 compares the amplitude spectra of a modulated baseband signal before encryption and after decryption.

FIG. 5 compares the amplitude spectrum of the original unmodified baseband signal, the encrypted baseband signal and the (decrypted) baseband signal recovered after the encryption/decryption method was applied. The encrypting and decrypting filters are not intended to distort the amplitude components. The three traces are almost indistinguishable from each other, indicating that the application of the filters has negligible effect on the amplitude spectrum and bandwidth.

Figure 6:
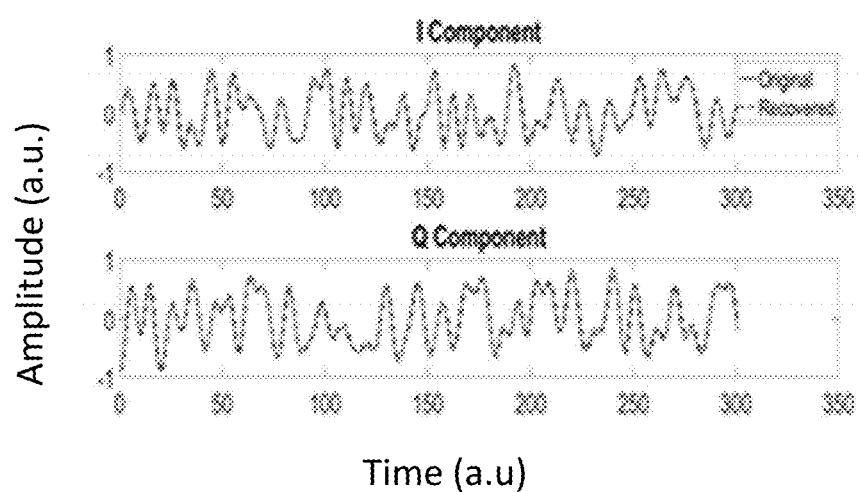
FIG. 6 compares the in-phase (I) and quadrature (Q) waveforms of an original baseband signal and the baseband signal recovered after encryption and decryption.

Finally, the internal vector demodulator of the VSA was used to capture the demodulated vector "I" and "Q" waveforms of the original unmodified baseband signal (solid lines) and the baseband signal recovered after the encryption/decryption method was applied (dashed lines), which are compared in FIG. 6. The two waveforms are again are almost indistinguishable, demonstrating that the original baseband signal can be recovered after encryption with the proposed method.

I: Encryption Key Generation Scheme in Time Division Duplex (TDD) Systems

According another embodiment, the phase offsets are generated by exploiting the channel reciprocity in TDD systems to probe or measure the channel response between two legitimate/authentic nodes (i.e. the specific transmitter and receiver) communicating over the wireless network and generate symmetrical phase encryption keys at each node based on the measured responses. The phase encryption keys, which are known only to the specific pair of nodes and are unique to the specific pair of nodes, can then be used to generate encrypted node-specific phase offsets. In this context, "symmetrical" means the same key is used by both nodes. TDD systems include applications in small cells and short range wideband millimetre wave wireless communications.

In practice, the channel response will always vary between different pairs of communicating nodes due to noise and differences in hardware (e.g. the DACs 120*a*, 120*b*, mixers 130*a*, 130*b* and band pass filters 170*a*, 170*b* in the specific transmitter and receiver). The non-ideal frequency responses or characteristics of the transmitter hardware (e.g. the DACs 120*a*, 120*b*, mixers 130*a*, 130*b*, band pass filters 170*a*, 170*b* and amplifier 155) ordinarily need to be compensated by means of a calibration process to maintain the integrity of the modulated carrier signal being transmitted, in addition to compensating for any amplitude modulation-amplitude modulation (AM-AM) distortion and/or amplitude modulation-phase modulation (AM-PM) distortion characteristics of the RF power amplifier 155.

This embodiment exploits the frequency responses of such non-ideal hardware along with the channel response (the air interface, i.e. the path between the nodes) to generate encryption information. Specifically, by probing the channel between two legitimate nodes, an estimated channel response can be determined that includes the unique frequency dependent circuit and channel impairments of the two nodes and can be used to generate symmetric phase encryption keys known only to the pair of nodes. This in turn can be used to generate a node-pair specific encrypting filter to encrypt the phases of the modulation symbols of the data intended to be communicated between the nodes.

Figure 7:
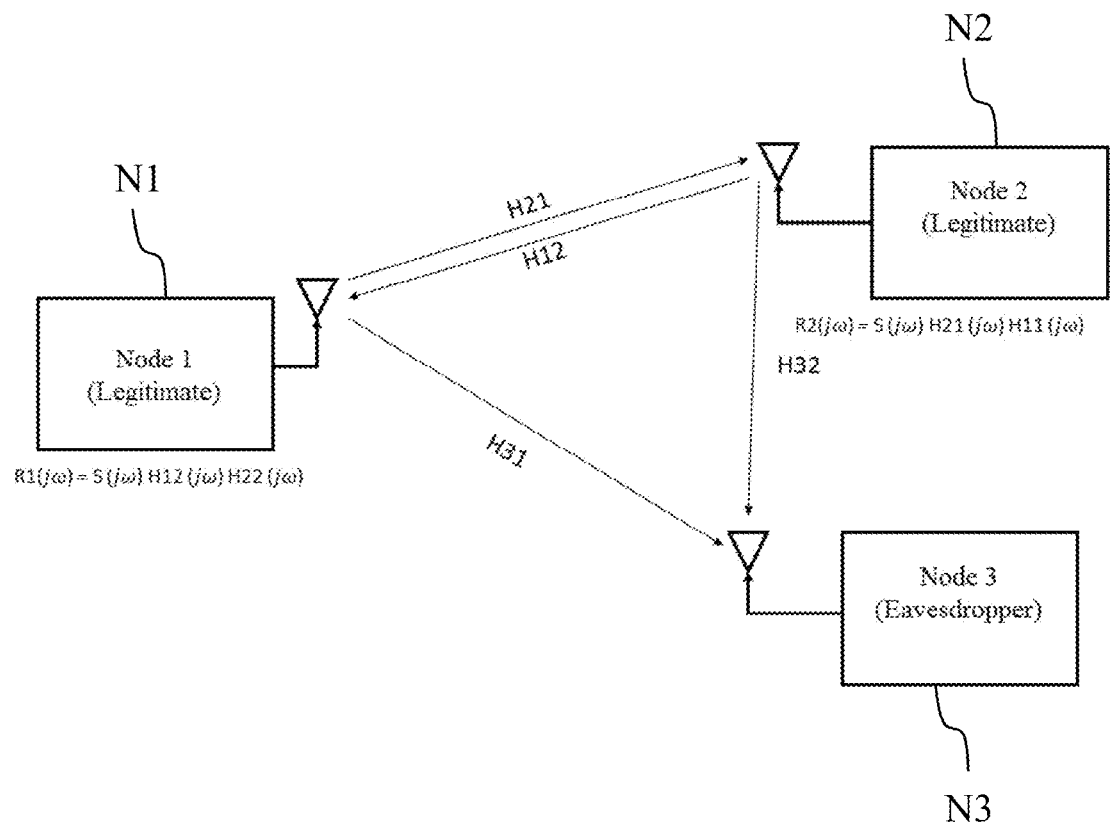
FIG. 7 shows a channel probing scheme for generating symmetric encrypting keys.

The generalised scheme of channel probing is illustrated in FIG. 7. In first step, a first legitimate node N1 transmits a predefined probe signal (e.g. a constant envelope probe signal, see below) without pre-compensating it to mitigate the circuit/hardware impairments in its transmitter 10. The second legitimate node N2 receives the transmitted probe signal and measures the impairments in it which is a convolution of the channel characteristics h21 and the circuit/hardware characteristics h11 of the transmitter 10 at the first node N1. The second node N2 then transmits another predefined probe signal (e.g. the same constant envelope probe signal) without pre-compensating it to mitigate the circuit impairments its transmitter 10. This probe signal is then received by the first node N1 which measures the impairments in it which is a convolution of the channel characteristics/response h12 and the circuit/hardware characteristics/response h22 of the transmitter 10 at the second node N1.

In a second step, each node N1, N2 convolves its own predetermined circuit characteristics (which are known and ordinarily used for pre-compensation) with the channel and circuit/hardware characteristics of the other node N1, N2 evaluated from the received signals. This leads to symmetric channel information being generated at both the legitimate nodes N1, N2 which can be used to generate the symmetric phase encryption key for the specific pair of nodes N1, N2. An eavesdropper (illegitimate) node N3 receiving signals from the first and second nodes N1, N2 respectively would find it difficult to distinguish the circuit/hardware characteristics from channel characteristics by evaluating the signals it received.

In third step, a primary encryption key is then derived from the symmetric channel information and used to generate the phase offsets for the encrypting and decrypting filters. A secondary key can also be derived from the symmetric channel information and used to generate encrypting symbols that are added to the original modulation symbols through modulo addition to encrypt the symbols prior to convolving with the encrypting filer. The key generating method for the single carrier and OFDM cases is described in more detail below.

The method exploits channel reciprocity between two legitimate nodes N1, N2. Practically a channel is never reciprocal, but it may be considered reciprocal within the channel coherence time $T_c$. The channel coherence time $T_c$ is dependent on the carrier frequency $f_c$, environmental fading and Doppler effect in the channel of operation through:

$$T_c = \frac{9}{16\pi f_D} \quad (4)$$

$$f_D = \frac{v f_c}{c} \quad (5)$$

where $f_D$ is the Doppler frequency, c is the velocity (in m/s) of propagation of an electromagnetic wave in free space, and v is the relative velocity between nodes (in m/s).

As such, the duration of the probe signal $T_{pr}$ and the propagation time $T_{pg}$ between the two nodes N1, N2 is required to be significantly shorter than the channel coherence time $T_c$. Further, in TDD systems, the transmission is half duplex implying that only one node N1 or N2 can transmit a signal in a given time-slot. Therefore, the total probing time $T_{tot}$ for both nodes N1, N2 to complete its channel probing must also be significantly lower than the channel coherence time $T_c$. In the simplest case of each node N1, N2 probing the channel once, one immediately after the other, this means $T_{tot}=2T_{pr}+2T_{pg}<T_c$.

Prior art approaches that exploit channel reciprocity between two legitimate nodes to generate symmetrical encryption keys include: L. Cheng et al., "Efficient physical-layer secret key generation and authentication schemes based on wireless channel-phase" Mobile Information Systems, vol. 2017, pp. 1-13, 07 2017; S. Mathur et al. "Radio-telepathy: Extracting a secret key from an unauthenticated wireless channel" in Proceedings of the 14th ACM International Conference on Mobile Computing and Networking, 2008, pp. 128-139; and Gao Baojian et al. "New physical layer encryption algorithm based on dft-s-ofdm system" in Proceedings of the 2013 International Conference on Mechatronic Sciences, Electric Engineering and Computer (MEC), December 2013, pp. 2018-2022. These prior art approaches probe the channel response using an OFDM modulated probe signals and use the secret key to scramble or encrypt the digital data before modulation and transmission. While OFDM signals provide a convenient stimulus where amplitudes and phases of sub-carriers are well defined, they have a varying envelope leading to a high peak-to-average power ratio (PAPR). This OFDM signal, when amplified by non-linear power amplifiers 155 in the transmitter 10 leads to AM-AM and AM-PM distortion in the probe signal itself, which in turn requires techniques such as upstream PAPR reduction and digital pre-distortion (DPD) for linear operation. However, the AM-AM and AM-PM distortion from the amplifier 155 may be considered negligible if the envelope of the transmitted signal is constant.

Accordingly, the phase encryption key generating method described herein uses a probe signal with a substantially constant envelope and a bandwidth equal to or greater than the bandwidth of interest. One example of a constant envelope probe signal is a frequency modulated chirp signal, which also has the advantage of having a relatively higher immunity to channel noise than OFDM signals. The chirp signal is described by equations 6 and 7 below:

$$y(n) = \sin\left\{2\pi\left(\frac{knT_s}{2} + f_{min}\right)nT_s\right\} \quad (6)$$

$$k = \frac{f_{max} - f_{min}}{M}, \quad (7)$$

where y(n) is the value of the nth sample (ranging from 0 to M), $T_s$ is the sample interval, M is the total number of samples, k is the frequency variation parameter, and $f_{max}$ and $f_{min}$ are the maximum and minimum frequencies respectively which define the frequency bandwidth of the chirp signal. The duration of the probe signal $T_{pr}=MT_s$. The sample interval $T_s$ is chosen such that it is lower than the Nyquist rate (½*BW) for the bandwidth of interest, and $T_{pr}$ is chosen to be significantly lower than half the channel coherence time $T_c$ to allow for each node N1, N2 to probe the channel at least once (described in more detail below with reference to FIG. 8). In addition, the two nodes N1, N2 also need to be synchronised in time so that they transmit the probe signals without collision at the appropriate time slots.

Referring to FIG. 7, the channel characteristics convolved with the circuit characteristics of the two wireless communication nodes N1, N2 can be effectively probed assuming the following conditions are satisfied:

1) Nodes N1 and N2 are the legitimate nodes and N3 is an eavesdropper;
2) Nodes N1 and N2 have their clocks and timing circuits synchronized with a common reference source, such as a GPS or other references sources known in the art (a timed interrupt logic may run on each node N1, N2 to enable transmission);
3) The carrier phases of the local oscillators (LOs) 140 are synchronized with GPS disciplined oscillators or other similar reference sources known in the art.
4a) The hardware signal paths in the receiver/receiver section of each node N1, N2 are calibrated for wideband amplitude and phase variations to mitigate hardware impairments such as IQ phase offset, IQ gain imbalance, etc. using techniques known in the art;
4b) The hardware signal paths 10a, 10b in the transmitter/transmitter section of each node N1, N2 are not calibrated or the transmitted signal is not pre-compensated for wideband amplitude and phase variations;
5) The impact of RF amplifier non-linearities, such as AM-AM and AM-PM distortion, on the constant envelope probing signals is negligible.

Figure 8:
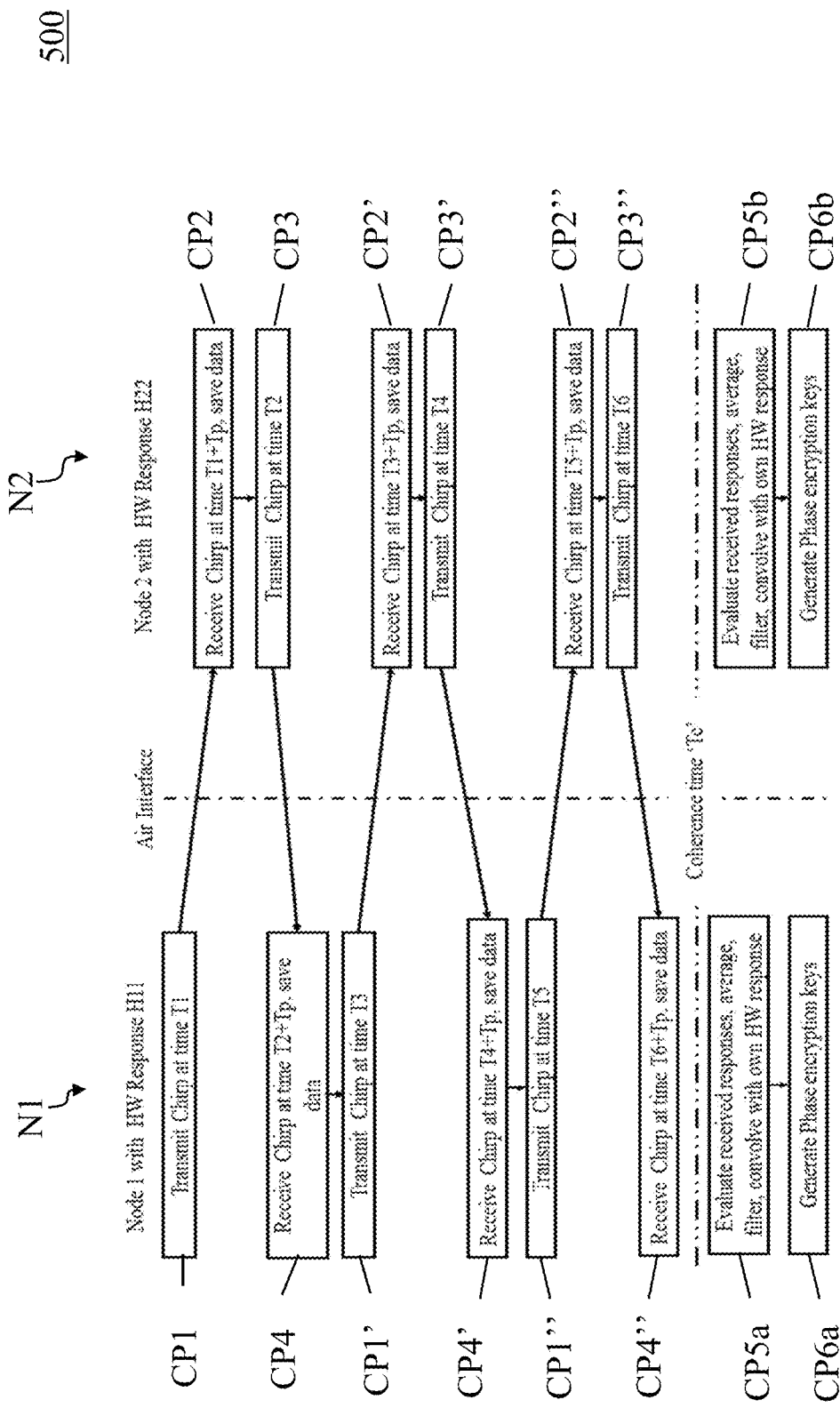
FIG. 8 shows a method of phase encryption key generation by channel probing.

FIG. 8 shows a method 500 of phase encryption key generation by probing the channel response between two legitimate nodes N1, N2 according to an embodiment. Each node comprises a separate transmitter and receiver, or a wireless transceiver with a transmitter section and a receiver section. A node N1, N2 may be in a transmit mode to transmit a signal, and a receive mode to receive a signal. In step CH1, node N1 initiates the channel probing by transmitting a predefined constant envelope probe signal, such as the chirp signal described by equations 6 and 7, to node N2 at time T1. Node N1 may switch to receive mode after transmitting the probe signal at time T1. At step CH2, node N2 receives the probe signal transmitted from node N1, e.g. at time T1+$T_{pg}$. The received probe signal, which includes the channel characteristics H21 convolved with the circuit/hardware characteristics H11 of the transmitter/transmitter section of node N1 is saved or stored at node N2. At step CH3, node N2 transmits the same predefined constant envelope probe signal, such as the chirp signal described by equations 6 and 7, to node N1 at time T2. Node N2 may be maintained in receive mode for the time period up until T2, where T2>T1+$T_{pr}$, $T_{pg}$+$T_g$, and $T_g$≤$T_{pg}$ is a guard interval. As such, node N2 may receive the transmission from node N1 until time T2 and transmits the predefined probe signal at time T2. Node N2 may switch back to receive mode after transmitting the probe signal at time T2. At step CH4, node N1 receives the probe signal transmitted from node N2, e.g. at time T2+$T_{pg}$. The received probe signal, which includes the channel characteristics H12 convolved with the circuit/hardware characteristics H22 of the transmitter/transmitter section of node N2 is saved or stored at node N1. Node N1 may receive the probe signal from node N1 during this time period until time T3, where T3−T2=T2−T1. This completes one channel probing cycle. This cycle may be repeated any number of times, e.g. at times T3, T5 and T4, T6 as shown by steps CH1' to CH4' and CH1" to CH4" in FIG. 8, until the channel coherence time $T_c$ is reached. For example, in the example of FIG. 8 the channel is probed three times, where T6−T1<$T_c$.

At steps CH5a and CH5b, at each node N1 and N2, the received/saved magnitude responses are normalised to its peak amplitude value. Optionally, where multiple channel probing cycles are performed, the normalised magnitude responses for each channel probing cycle are averaged. The (averaged) normalised response r2 received by node N2 is an ideal chirp signal y(n) convolved with the impulse response h11 of node N1's transmitter circuit/hardware and the impulse response h21 of the channel. Similarly, the (averaged) normalised response r1 received by node N1 is an ideal chirp signal y(n) convolved with the impulse response h22 of node N2's transmitter circuit/hardware and the impulse response h12 of the channel. At steps CH5a and CH5b, each node N1, N2 may calculate the FFT of the (averaged) normalised responses r1, r2 for ease of analysis. The FFTs of r1 and r2 may be expressed as R1(jω)=Y(jω) H22(jω)H12(jω) and R2(jω)=Y(jω)H11(jω)H21(jω), respectively. In step CH5a, node N1 de-convolves y(n) from r1, and convolves the result with its own transmitting hardware's impulse response h11 to yield a new response function e1, where E1(jω)=H11(jω)H22(jω)H12(jω) in the frequency domain. Similarly, in step CH5b, node N2 de-convolves y(n) from r2, and convolves the result with its own transmitting hardware's impulse response h22 to yield a new response function e2, where E2(jω)=H22 (jω)H11 (jω)H21(jω) in the frequency domain. It can be seen that if H12=H21, then E1=E2.

The above scheme therefore generates substantially symmetric (i.e. the same) channel information at each node N1, N2 from asymmetric transmitted information. At steps CH6a and CH6b, symmetric phase encryption keys are generated at each node N1, N2 based on the symmetric channel information e1, e2, as described in more detail below.

The eavesdropper node N3 will be able to receive the transmitted probe signals but will not be able to distinguish the impairments caused by the channel from those caused by (un-calibrated) transmitting hardware at each legitimate node N1, N2. The proposed phase encryption key scheme is comparable with the Diffie-Hellmann key exchange scheme (R. C. Merkle, "Secure communications over insecure channels," Comm. ACM, vol. 21, no. 4, pp. 294-299, April 1978). Since the transmission of the probe signals is controlled by timed interrupts, any response by the eavesdropper node N3 to the probe signal from node N1 will be accompanied by the response from node N2. This can delay the agreement of symmetric keys between node N1 and node N2, but node N3 will not be able to obtain the phase encryption key data, at least because of the different hardware characteristics at node N3.

Figure 9:
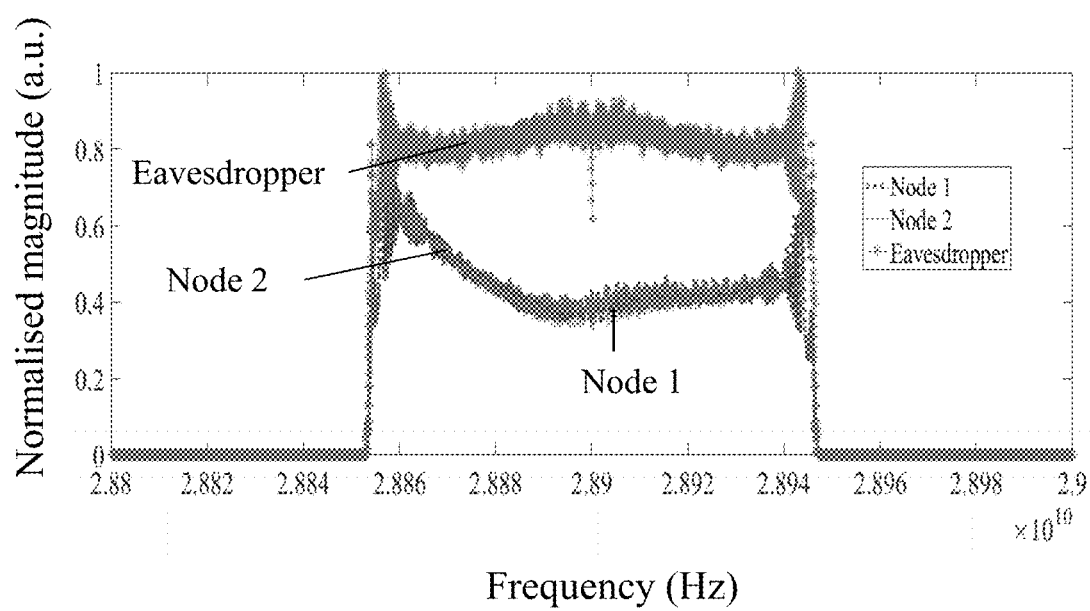
FIG. 9 shows example channel responses determined between legitimate nodes and an eavesdropper node.

In a practical scenario, E1 will not be equal to E2 owing to noise, variations in performance of receiving hardware and measurement errors but will be highly correlated showing similar trends. This is illustrated in FIG. 9, which shows example (shifted) normalised magnitude spectra of experimentally determined frequency responses E1 and E2, computed at nodes N1 and N2 over a bandwidth of 100 MHz at a carrier frequency of 28.9 GHz ($2.89 \times 10^{10}$ Hz). As shown, although not identical, the responses E1 and E2 are highly correlated. Also shown is an example response received by the eavesdropper at node N3, which is substantially different to the symmetric responses E1 and E2. The evaluated responses E1, E2 may be subject to a smoothing algorithm, e.g. moving median filtering of a predetermined window length, to mitigate the effect of noise and receiving hardware introduced impairments.

In an embodiment, symmetric data for the phase encryption keys is extracted from the symmetric channel information e1, e2 by performing nonlinear curve-fitting on the computed frequency responses E1, E2, and using the resulting curve-fitting coefficient values to derive a first set of encryption keys, labelled key2.

In one example, the magnitude spectra of E1, E2 may be classified into regions depending upon change of slope of the frequency response and each region subject to piecewise non-linear curve-fitting operations applying the method of least squares. In FIG. 9, the responses in the frequency band 28.85 GHz to 28.86 GHz show a rising slope, which may be classified as a region. Similarly, the responses in the bands 28.6 GHz to 28.9 GHz, 28.9 to 28.92 GHz, 28.92 GHz to 28.94 GHz and 28.94 to 28.95 GHz may be classified into four more regions. Again, magnitude spectra may be subject to a smoothing operation, such as a moving median filtering operation, to reduce noise in the data. The frequency responses E1, E2 in one or more of the above regions may be subject to curve-fitting operation, e.g. in accordance with the generic non-linear curve $y = ax^3 + bx^2 + cx + d$, where a, b, c, and d are the curve-fitting coefficient values. In an example, the ratio of the curve fitting coefficient values are determined, rounded to the nearest integer values and quantised to the nearest prime numbers to yield a first set of encryption keys, labelled key1, e.g. having five elements in this example.

Alternatively or additionally, symmetric data for the phase encryption keys can be extracted from the responses E1 and E2 directly by evaluating the range of indices or frequency bin numbers in predefined regions or sub-bands of the responses to derive a second set of encryption keys, labelled key2.

In an embodiment, the responses E1, E2 are divided into a convenient number of regions or sub-bands of equal lengths and classified on the basis of the signal power distribution. For example, the frequency responses E1, E2 shown in FIG. 9 may be divided into eight sub-bands of bandwidth 12.5 MHz each, and these sub-bands may be numbered in descending/ascending order according to the magnitude/power in each sub-band, e.g. the magnitude integrated over the sub-band or the average or RMS (root mean squared) value of the (normalised) magnitudes in each sub-band. The highest prime number in the range of indices or frequency bin numbers for each region is then extracted. For example, if the responses e1, e2 were sampled at a frequency of 200 MHz and the FFT was computed (to yield E1 and E2) with 2048 frequency bins, the bandwidth of 100 MHz would occupy 1024 frequency bins, with each bin representing a frequency interval of 97.65625 kHz and each sub-band of 12.5 MHz bandwidth would occupy 128 points in the FFT space. In FIG. 9, the bandwidth of interest lies between FFT bin numbers 513 to 1537, and the sub-band of 12.5 MHz having the highest integrated power occupies the frequency bins from 641 to 768. The highest prime number in this sub-band is 761. This may be used as the first element of the second key set, key2. Similarly, the highest prime number in the sub-band with the next highest integrated power is extracted and can be used as the second element of key2. This continues until all eight elements of key2 are extracted (corresponding to the eight sub-bands). The sequence in which the prime numbers are entered in the space of key2 should be the same at both nodes N1, N2.

The key sets key1 and/or key2 are expected to be the same at the legitimate nodes N1 and N2 due to highly correlated responses E1, E2 and different at the eavesdropper node N3. This can be inferred from FIG. 9, where the response determined at the eavesdropper node N3 is clearly very different and uncorrelated to E1 and E2.

The methods of extracting symmetric encryption key data from the symmetric channel information e1, e2 described above are not exhaustive and the skilled person will appreciate that there may be several other ways of extracting symmetric encryption keys depending upon the application. For example, the specific function of the non-linear curve used to derive key1 is not essential. Nor is number of sub-bands used or the specific prime number extracted from each sub-band to derive key2. It is only important that both nodes N1 and N2 apply the same procedure.

One of the keys (key1 or key 2) may be used to generate the encrypting phase offsets for the encrypting/decrypting filter that is convolved with the modulated baseband signal to conceal the symbol constellation, e.g. as in step S3 of FIG. 3. Optionally, the other key may be used to scramble or encrypt the symbols of the modulated baseband signal, to essentially encrypt the data bit stream being transmitted at symbol level, e.g. in step S1 of FIG. 3.

To maintain security against brute force attacks and avoid letting the adaptive equalizers in the eavesdropping node N3 learn the encrypting information, the encrypting symbols and the phases offsets can be updated with new values after convenient intervals.

Ia: Encrypting Single Carrier Systems

Single carrier modulated signals can be encrypted using dispersive filters to conceal the symbol constellation, as described above. The general method of encryption and decryption shown is the same as that shown in FIG. 3. However, in this case the phase offsets are determined using one of the keys (key1 or key2) derived at each node N1, N2 using the probed channel responses according to the method 500 described above.

In an embodiment, a subset of the prime numbers in one of the keys (e.g. key2) are used as coefficient values in a first non-linear mathematical function to generate the phase offsets. In this example, the first non-linear function is an elliptic function in the form: $y = p^2 = \mod(x^3 + f_1 x + f_2, f_3)$, where $f_1$, $f_2$ and $f_3$ are prime numbers selected from the key, x is the frequency bin number in the FFT phase spectrum, $p^2$ is the outcome of the function for a given x that yields the phase offset (designated as y) for that value of x. However, it will be appreciated that other non-linear functions may be used with any number of coefficients. The prime numbers may be selected randomly, according to a predefined sequence, however, each node should use the same subset.

Each frequency bin number representing the frequency of a phase component in the FFT phase spectrum of the (test) FIR filter kernel in the bandwidth of the interest is input into the non-linear function to generate a set of first phase offsets for generating the encrypting filter. The set of first phase offsets may be or comprise a first phase variation curve. The values of the first phase offsets may be shifted to yield a phase variation curve symmetric about zero. The (shifted) first phase offsets may be multiplied by a scaling factor so as to have a peak-to-peak variation equal to or greater than $\Delta\phi_{max}$. The first phase offsets may be convolved with a filter function, such as a raised cosine filter, to ensure the first phase variation curve is substantially continuous. This may be necessary to maintain the integrity of the envelope of the transmitted signal. A set of second phase offsets (or a second phase variation curve) for generating the decrypting filter is determined by inverting the first phase offsets (after filtering, if used). The encrypting and decrypting filters are then generated using the first and second phase offsets in the same way as described above.

Optionally, a subset of the prime numbers in the other of the keys (e.g. key1) are applied as coefficient values in a second non-linear function to generate encrypting symbols which are added to the original input modulation symbols through modulo addition, prior to applying the encrypting filter. The base of the modulo addition depends on the order of the chosen modulation scheme. For example, the base of the modulo addition would be 4 if the modulation scheme is QPSK (since there are four different symbols).

This provides two tiers of security in the physical layer: encrypting the phases of the modulated symbols so that the constellation is concealed from eavesdroppers; and encrypting the modulated symbols of the signal to be transmitted by performing modulo addition with another set of symbols generated with the prime numbers.

Once the encryption keys (key1 and key2) and the encrypting/decrypting filters are generated at each node N1, N2, they may be tested for symmetry. In an example, node N1 generates a set of random bits and modulates them according to the intended modulation scheme, e.g. 8PSK. The modulation symbols are subject to encryption at symbol level through modulo addition of encrypting symbols generated using one of the keys, e.g. key1. The encrypted symbols are subject to the necessary re-sampling, pulse shaping (e.g. root raised cosine filtering) depending on the modulation standard and then convolved with the encrypting filter generated using the other of the keys, e.g. key2. After the other necessary signal processing operations the encrypted modulated baseband signal is transmitted. Node N2 receives the signal transmitted by node N1, digitizes it, and convolves the received baseband signal with the decrypting filter to recover the modulation constellation. The recovered baseband signal may be subject to equalization to compensate for channel impairments. If the recovered modulation phases at this stage do not correspond to standard values within an agreed deviation limit, a failure message is sent to node N1 and the entire key generation process restarts. If they do correspond to standard values within an agreed deviation limit, the recovered baseband signal is demodulated to recover the transmitted symbols and these are decrypted through modulo subtraction with the first key (key1) generated at node N2. Node N2 then re-modulates the recovered symbols onto another baseband signal with the same modulation scheme, encrypts the phases with its encrypting filter generated using its second key (key2) generated at node N2, and re-transmits the signal. Node N1 now receives the signal transmitted by node N2, decrypts and demodulates the data (using its decrypting filter and key1) to recover the data bit-stream and compares it with the data it originally transmitted. If a match is found, a success message is transmitted to node N2. This completes the phase encryption key generation and agreement process, along with the design of symmetric encryption and decryption filters. It may be noted that no confidential data is transmitted until this stage is completed.

The encrypting phase offsets and encrypting symbols used to encrypt the transmitted signal can be updated to new values at both nodes N1, N2 to help maintain security against brute force attacks. This can be done, e.g. by running a common algorithm that selects different non-linear functions and/or different prime numbers from the keys symmetrically at both nodes N1, N2. This may be done after predefined time periods have elapsed. This may be done through timed interrupts.

Ib: Encrypting OFDM Systems

In the case of OFDM systems, the task of modulation and demodulation is performed in the frequency domain, where each sub-carrier (a point in frequency space with a different centre frequency) is mapped to a specific vector modulation constellation point denoted by a unique amplitude and phase (i.e. symbol) for a period of time (the symbol duration). The inverse FFT of the modulated sub-carriers is then obtained to convert them to the time domain for amplification and transmission. As such, unlike in the single carrier case, each modulation symbol is transmitted on a separate sub-carrier in OFDM modulated signals. Therefore, rather than using a dispersive filter, the symbol constellation can be distorted in OFDM systems by adding controlled phase offsets directly to the phase of the sub-carriers in the frequency domain prior to obtaining the inverse FFT. This approach is taken here.

Encrypting phase offsets and, optionally, encrypting symbols and are generated using the keys (key1 and key2), as in the single carrier case. The generated first phase offsets are added directly as offsets to the phase of each respective sub-carrier in the frequency domain prior to obtaining the inverse FFT. This is computationally more efficient than convolving the signal in time domain with a dispersive filter. Optionally, the modulation symbols to be transmitted are encrypted by performing a modulo addition with the encrypting symbols.

Randomisation of phases of the sub-carriers in an OFDM modulated signal is known to reduce its PAPR and provide security of information (see, e.g. P. Cheng et al., "Improved SLM for PAPR reduction in OFDM system," in 2007 IEEE 18th International Symposium on Personal, Indoor and Mobile Radio Communications, September 2007, pp. 1-5). As such, preferably a set or sequence of first phase offsets is chosen with maximum variance to minimise PAPR. To maximise the variance of the phase offsets, the positions of the prime numbers in the first non-linear function can be interchanged and the first non-linear function executed a number of times to obtain a convenient number of different sets or sequences of first phase offsets. The set with largest variance can be chosen, or their element-wise product can be taken to maximise variance. This is an enhancement over prior art approaches.

The generated encryption keys (key1 and key2) generated at each node N1, N2, may again be tested for symmetry, as explained for the single carrier case, except that the first/second phase offsets are added/subtracted directly at the transmitting/receiving nodes instead of convolving with encrypting/decrypting filters.

Figure 10:
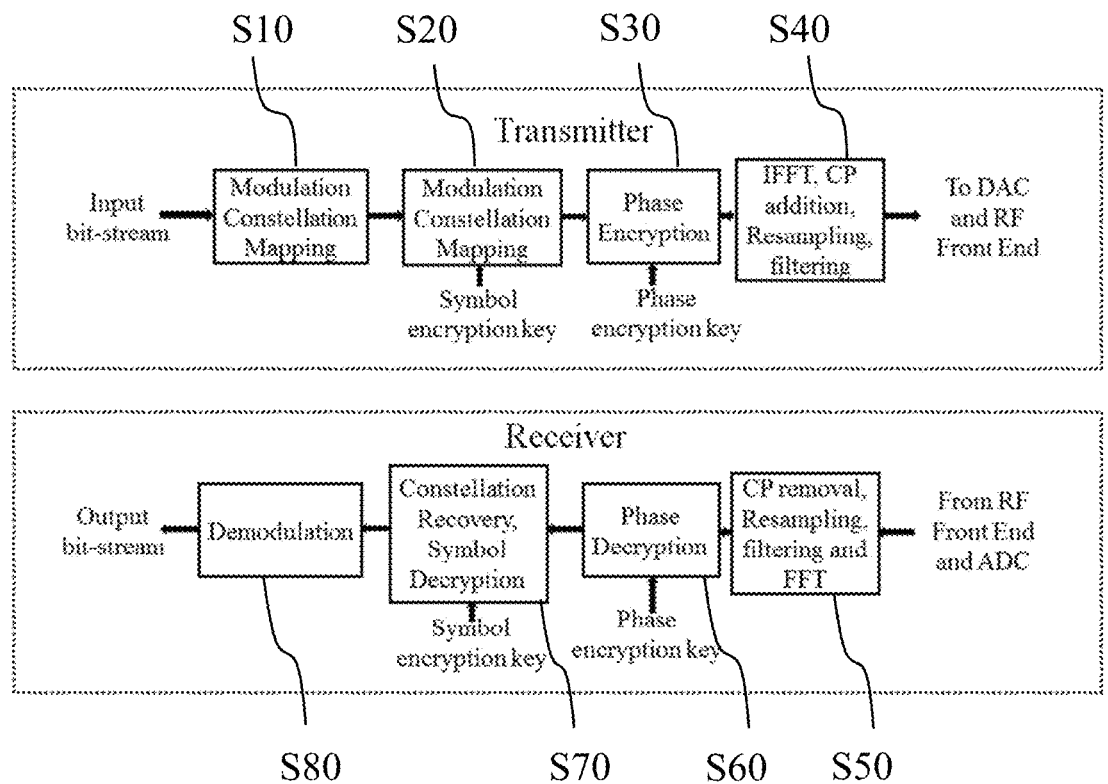
FIG. 10 shows a method of physical layer encryption and decryption in OFDM systems.

The physical layer encryption and decryption process in OFDM systems is summarised in FIG. 10. In step S10, the modulation symbols are generated (e.g. by the DSP 110) and each sub-carrier is mapped to a specific vector modulation constellation point denoted by a unique amplitude and phase (i.e. symbol). Optionally, in step S20, the modulation symbols to be transmitted are encrypted by performing modulo addition with the generated encrypting symbols. In step S30, the generated first phase offsets are added directly as offsets to the phase of each respective sub-carrier in the frequency domain. Adding phase offsets to the modulated phases of each sub-carrier encrypts them. In step S40, the inverse FFT of the encrypted sub-carriers is obtained to transform them from the frequency domain to a time domain signal (to generate the encrypted baseband signal). This may be subject to pulse shaping and filtering operations with a FIR filter to define a bandwidth. Steps S10-S40 may be performed in the DSP 110 of the transmitter 10. The encrypted baseband signal is then sent to the DACs 120a, 120b and RF front end of the transmitter 10 where it is up-converted to the carrier frequency for transmission.

In step S50, the FFT of the baseband signal received at the receiver after down-conversion and analogue-to-digital conversion is obtained to transform it from the time domain to the frequency domain. In step S60, the generated second phase offsets are added to phase of each respective sub-carrier in the frequency domain to recover the (encrypted) symbols. Optionally, in steps S70 the modulation symbols recovered are decrypted by performing modulo subtraction with the generated encrypting symbols. In step S80, the sub-carriers are demodulated. Steps S50-S80 may be performed in the DSP of the receiver (not shown).

II: Experimental Validation

The above described encryption and decryption scheme was experimentally validated in hardware for an 8PSK signal and for a QPSK-OFDM signal with a bandwidth of 100 MHz, carrier frequency of 28.9 GHz and power +2 dBm. The receiver consisted of an RF front end with a noise figure around 3 dB and gain of 13 dB which down-converted the received signal to an intermediate frequency (IF) of 600 MHz. This was followed by an analog-to-digital converter (ADC) clocked at 4 Gsps that digitized the down-converted signal. Further down-conversion and demodulation were accomplished in the digital domain. An IF amplifier with a gain of 10 dB was used in the receiver section of node N1 and no IF amplifier was used in the receiver section of node N2 to intentionally introduce hardware differences at the two nodes N1, N2 which would introduce differences in the noise figures at the two nodes N1, N2.

IIa: Encryption Key Generation

The test apparatus was designed with propagation path length of a meter between its ends. This distance corresponds to 96 wavelengths at 28.9 GHz. One of the ends of the apparatus was mounted with a patch antenna referred to as node N1. Two additional antennas were fabricated on a similar substrate for nodes N2 and N3 at a spacing of eight wavelengths with a ground plane in between them (node N3 is designated to be the eavesdropper). An overall path loss of 51 dB was observed between nodes N1, N2. The receiver sections of nodes N1, N2 were calibrated for flatness of frequency response over the bandwidth of interest. The un-calibrated/un-compensated hardware frequency responses of the transmitter sections of the two nodes N1, N2 over the bandwidth of interest were recorded using a calibrated spectrum analyzer (FSQ40 Vector Signal Analyzer from Rohde and Schwarz) connected to the respective RF outputs.

A computer running MATLAB was used as the DSP and timed interrupt generator. A pair of DACs followed by a Ka Band transmitter was connected to each of nodes N1 and N2. The RF paths in the receivers and transmitters were duplexed with single pole double throw (SPDT) switches. As the timing of transmission and reception were known exactly, the individual responses were extracted from the overall received responses at the appropriate time intervals and evaluated individually to determine the extent of symmetry in the responses. The probe signal chosen was a chirp pulse of duration 3.125 μs with a bandwidth of 100 MHz generated at sample rate 640 MHz. The transmitters at N1 and N2 were made to transmit three times at alternate time intervals of 3.125 μs, according to the scheme shown in FIG. 8.

The magnitude responses received over three time slots recorded at each node N1, N2 were averaged, filtered, down-converted digitally to zero IF and down-sampled to 400 MSPS. The received signals consist of the chirp pulse convolved with the impulse response of the channel and the hardware of the transmitting node's transmitter section. The received signal was transformed to frequency domain by an FFT operation to de-convolve the chirp pulse and the resulting amplitude and phase values were stored in the form of an FIR filter kernel. This was further convolved with the receiving node's own transmitter section hardware impulse response. This yielded similar channel information/data e1, e2 at both the legitimate nodes N1, N2, the FFT of which (E1, E2) is used to derive encryption keys (key1, key2) at each node N1, N2, as detailed in section I.

Figure 11:
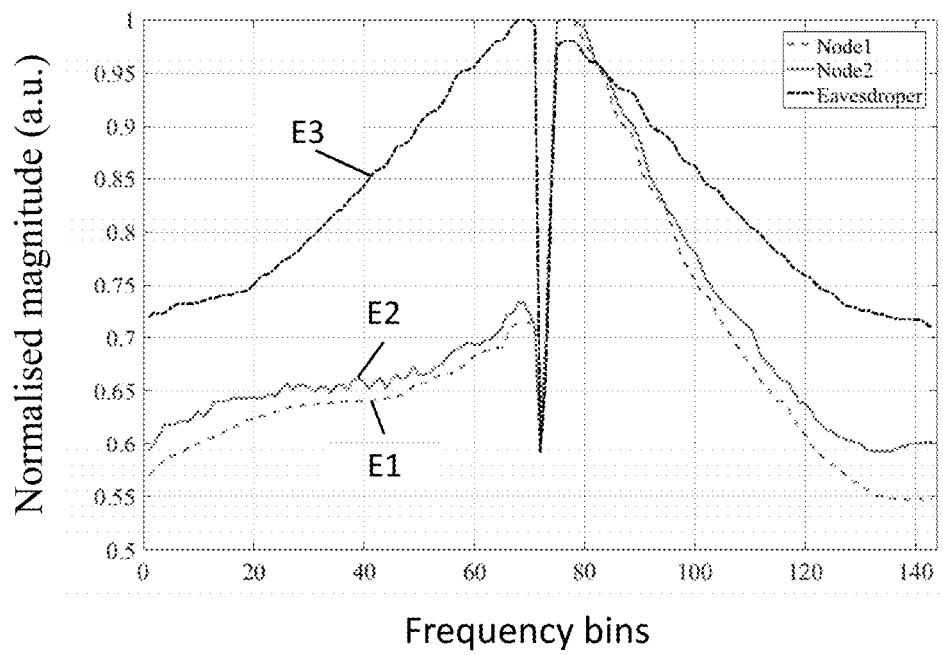
FIG. 11 shows a shifted plot of the normalised magnitude spectra of the channel probing data obtained at legitimate nodes and an eavesdropper node.

FIG. 11 shows a shifted FFT plot of the normalised magnitude spectra (E1, E2, E3) of the channel data e1, e2, e3 determined at each node, N1, N2 and N3 (the eavesdropper node) against the frequency bin number. A bandwidth of 112.5 MHz (100 MHz+additional bandwidth of 12.5 MHz) in a 512 point FFT space sampled at 400 MHz would occupy 144 points symmetrically on both sides of the FFT. The plots shown in FIG. 11 represent the first and last 72 points (which contain the convolved channel and circuit responses). The channel data e2, E2 measured at node N2 exhibits a higher amount of noise than that at N1 due to a reduced gain at node N2, which was introduced deliberately to assess the ability to produce symmetric encryption keys in the presence of noise. The effect of noise was mitigated by moving median filtering.

The plotted FFT curves were divided into regions or sub-bands based on the change of slope. Each region was then subject to piece-wise curve-fitting operation using a least squares fit with a non-linear function of the form $y=ax^3+bx^2+cx+d$, where a, b, c, and d are the curve-fitting coefficient values. Data located at the centre of the curves relating to the band edges of the FFT were ignored. A ratio of fitting coefficient values k1, k2=(d/a)+b extracted from the curves at each node N1, N2 was computed. Any coefficients with a value less than 0.1 were replaced by 0. Example sets of ratios k1 and k2 obtained at node N1 and node N2 when the curves were divided into five regions are: set1(N1)={5.06257, −1.49450, 0.9875, 30.0487, −11.475} and set1(N2)={5.20483, −1.49222, 0.9723, 30.0430, −10.633}. Each of the ratio values were multiplied by a power of 10 such that there were at least two digits before a decimal point and the magnitude was rounded off to the nearest prime number. This yielded symmetric (substantially identical) sets of prime numbers for the first key (key1) generated at each node: key1(N1)={51, 13, 97, 31, 11} and key1(N2)={51, 13, 97, 31, 11}.

To generate the second key set (key2), the normalised responses shown in FIG. 11 were divided into eight regions/sub-bands of equal length (18 data points) and the RMS value of the magnitude in each region was evaluated. The largest prime number in the range of frequency bin numbers/indexes for each region was extracted. The extracted prime numbers were arranged in descending order of the RMS magnitude value of the region from which they were extracted. The RMS magnitude values of each region evaluated at nodes N1 and N2 are: rms(N1)={0.6209, 0.6447, 0.6543, 0.6830, 0.8985, 0.7882, 0.6563, 0.5930} and rms(N2)={0.5719, 0.6072, 0.6217, 0.6504, 0.8871, 0.7815, 0.6351, 0.5551}.

Referring to FIG. 11, one can readily observe by inspection that the region with the largest average or RMS magnitude value is between data points 73 and 90. The highest prime number in the frequency bin numbers in this region is 89 and hence it would be the first entry in the second key set (key2). This process yielded symmetric (substantially identical) sets of prime numbers for the second key (key2) at each legitimate node: key2(N1)={89, 107, 71, 113, 47, 31, 17, 139} and key1(N2)={89, 107, 71, 113, 47, 31, 17, 139}. As such, the entries in the second key set key2 are just the highest prime numbers in each region but the sequence in which they are entered is unique to the channel data e1(E1), e2(E2) generated at each legitimate node N1, N2 and used to generate the encrypting phases offsets. This can use the same elliptical function as the encrypting symbols, but the inputs to the function are from the second key set. In principle, any mathematical function can be used. A higher number of entries can be obtained for both the key sets key1, key2 from the channel data curves by dividing the data into a greater number of regions and/or by generating FFT data with a higher number of data points. As mentioned previously, the skilled person will appreciate that there are several other ways to use the channel data (convolved channel and hardware characteristics) for key generation.

IIb: Encryption of Single Carrier Modulated Signals

An 8PSK modulated signal of bandwidth 96 MHz was chosen for this example. The symbol rate was set at 80 Msps. A random bit-stream of 36000 bits was generated and mapped on to 12000 8PSK symbols. Each symbol was first encrypted at N1 using encrypting symbols that were generated by applying three of the five prime numbers in the first key set key1(N1) in the modified elliptic function: y=mod (mod(nearest(sqrt($f_1 x^3 + f_2 x$)), $f_3$),8), where the values chosen for $f_1$, $f_2$ and $f_3$ were 51, 97 and 11 (i.e. the first, third and fifth entries in key1) respectively to encrypt the first 6000 8PSK modulated data symbols, and the values of $f_2$ and $f_3$ were swapped to generate the encrypting symbols for the next 6000 8PSK modulated data symbols. The 8PSK data symbols were encrypted by performing a modulo (base 8) addition with the encrypting symbols. The same encrypting symbols were generated at N2 for decryption using the entries in its key1(N2). The modulated digital baseband was subject to raised cosine filtering (after adding the encrypting symbols) with roll off factor α=0.2 at an oversampling ratio of 4. The resulting sample rate was 320 Msps and the occupied bandwidth was 80×10⁶(1+a)=96 MHz.

Figure 12:
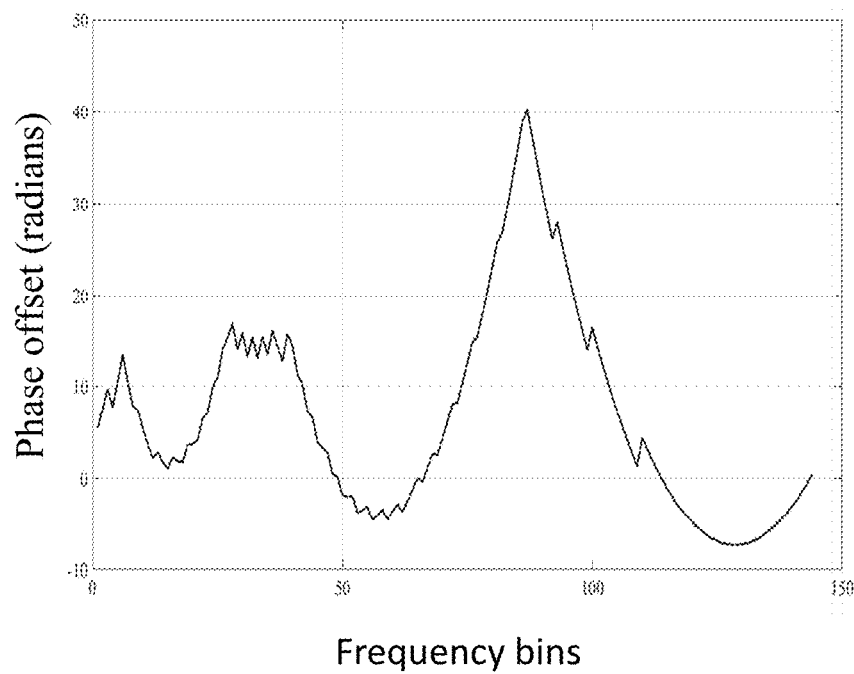
FIG. 12 shows a phase offset variation curve.

The value of $\Delta\phi_{max}$ for this signal was calculated to be 7.23 radians. The phases for the encrypting filter at N1 were derived by applying three of the five entries in key set key2(N1) as coefficient values in the elliptic function as described in section Ia. The values of $f_1$, $f_2$ and $f_3$ selected for this operation were 47, 89 and 17 respectively (i.e. the first, fifth and seventh entries in key2). The resulting set of first phase offsets or first phase variation curve in the bandwidth of interest is shown in FIG. 12. The first 39 values of the first phase variation curve were extracted, subject to root-raised cosine filtering with an up-sampling factor of 4 and added to the corresponding phase components of the FFT phase spectrum of the test (FIR) filter kernel to generate a modified phase spectrum. This reduces the computation complexity needed, compared to using all the values/points in the band of interest and adding them directly (although that can be done if the DSP at the communicating node is fast enough). Raised cosine filtering adds intermediate or interpolating samples between existing values by the up-sampling factor, so the 39 values will expand four times to 156 values. The inverse FFT of the modified filter was computed to obtain the encrypting filter at N1. The decrypting filter was obtained using the second set of phase offsets, as described above. Three more encrypting and decrypting filters were generated at N1 and N2 respectively using different subsets of phases offsets from the curve in FIG. 12 at indices 40 to 156. The encryption and decryption filters were switched after transmission of 6000 symbols.

Figure 13A:
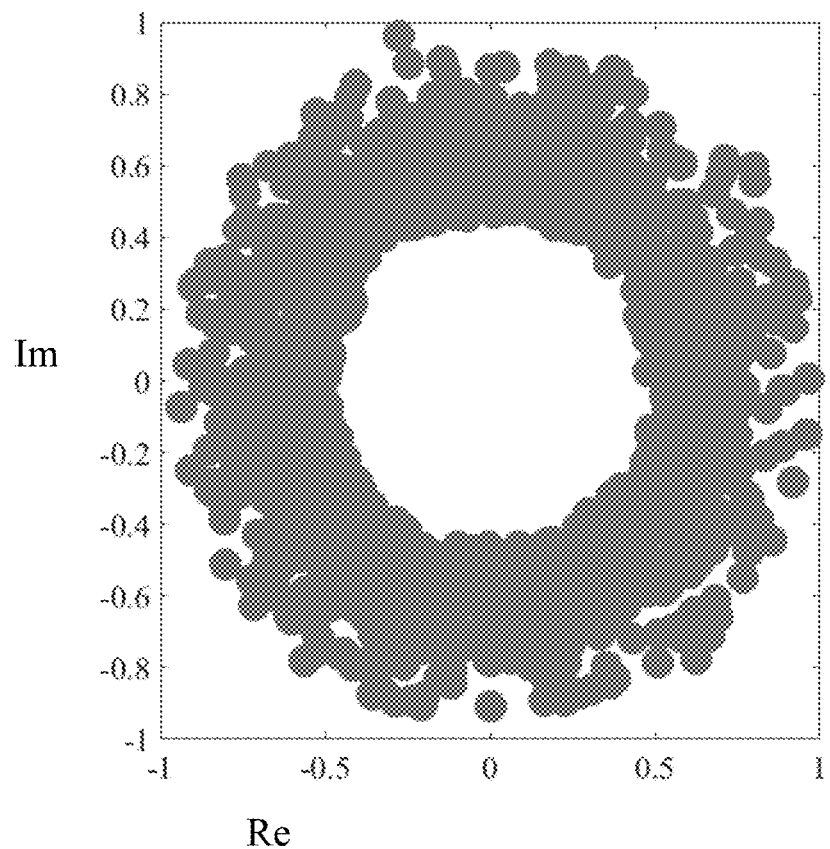
FIGS. 13a and 13b show complex plane plots of the symbol constellation of a received single carrier encrypted modulated baseband signal before after decryption, respectively.
Figure 13B:
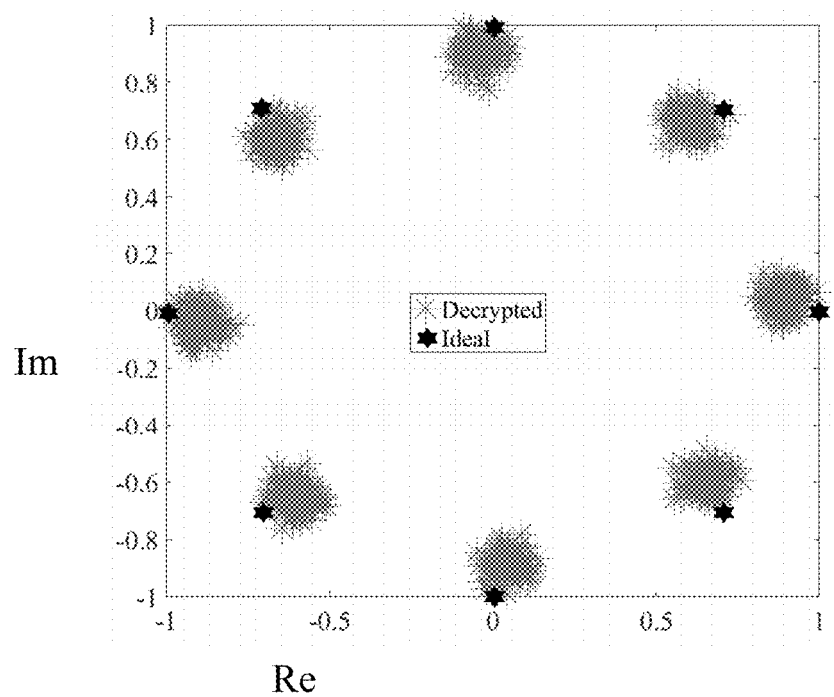

The modulated baseband signal was convolved with the encrypting filter at N1 to conceal its constellation and transmitted. In this validation example, the encryption and decryption filters were switched after transmission of 3000 symbols to help avoid detection of the encrypting phase offsets by an adaptive equalizer in the eavesdroppers. However, this number is not essential—the filters can be switched earlier or later. Adaptive equalizers learn the extent of degradation in a signal and correct them. Changing the encrypting filters frequently thus denies the opportunity for adaptive filters at eavesdropping nodes to learn anything useful. The encrypted signal was transmitted over the air interface at 28.9 GHz, received by N2, subject to equalization and decryption filtering, down-sampling and recovery of symbols. The recovered symbols were decrypted by modulo-subtraction of the encrypting symbols and the transmitted bit-stream was demodulated without errors. FIGS. 13a and 13b show plots of the received constellation of the 8PSK signal prior to equalization and decryption and after decryption and channel equalization, respectively.

A VSA with an internal equalizer based on LMS (Least Mean Squares) was used as the eavesdropping receiver. The length of the equalizer was set at 10 and step size was set at 0.05. The sampling frequency of the VSA was also set at 320 MHz. This implied 40 taps for the internal filter due to an over-sampling factor of 4. The transmission was repeated continuously for five minutes and a faithful recovery of the constellation could not be observed. The length of the equalizer in the VSA was varied from 5 to 20 in steps of 5 and step size was also switched between 0.01 and 0.05 in each case after running for 5 minutes. No faithful recovery of the constellation could be observed in any attempt. In order to identify the probability of interception by a faster receiver, the transmission symbol rate was halved to 40 Msps so as to provide sufficient over-sampling in the VSA whose maximum sample rate was limited to 320 Msps. This also could not recover the constellation after running for five minutes. All the modulated symbols were then subject to encryption by only the first encrypting filter instead of switching between multiple filters. This led to partial identification of the symbols after a learning time of 8 minutes. It was inferred that switching the encryption filter provided tighter security against eavesdroppers. The observations demonstrate that it is essential to use the appropriate decrypting filter to first recover the modulation symbols before attempting to demodulate the signal.

IIc: Encryption of OFDM Signals

A 2048 point FFT based OFDM signal with 1664 active sub-carriers including 128 pilots was generated at sample rate 100 MHz. The modulation chosen for the sub-carriers was QPSK. The data to be transmitted was mapped onto QPSK constellation points on the 1536 active sub-carriers. The amplitudes of all the active sub-carriers were constant since the chosen modulation scheme was QPSK. A constant phase of 45 degrees was chosen for the pilots. The objective here was to encrypt the signal to jointly achieve PAPR reduction and security in the physical layer. A random stream of 3072 bits was generated at N1 and modulated on the 1536 data subcarriers with QPSK modulation. The modulated symbols on the sub-carriers were first subject to encryption through modulo addition with encrypting symbols generated using the same subset of prime numbers in the first key set key1(N1) with the same modified elliptical equation used in the single carrier case described in section IIb, but applying a modulus of 4 instead of 8. The values of $f_1$, $f_2$ and $f_3$ were rotated for subsequent transmissions. The same encrypting symbols were generated at N2 for decryption using the entries in its key key1(N2).

Figure 14A:
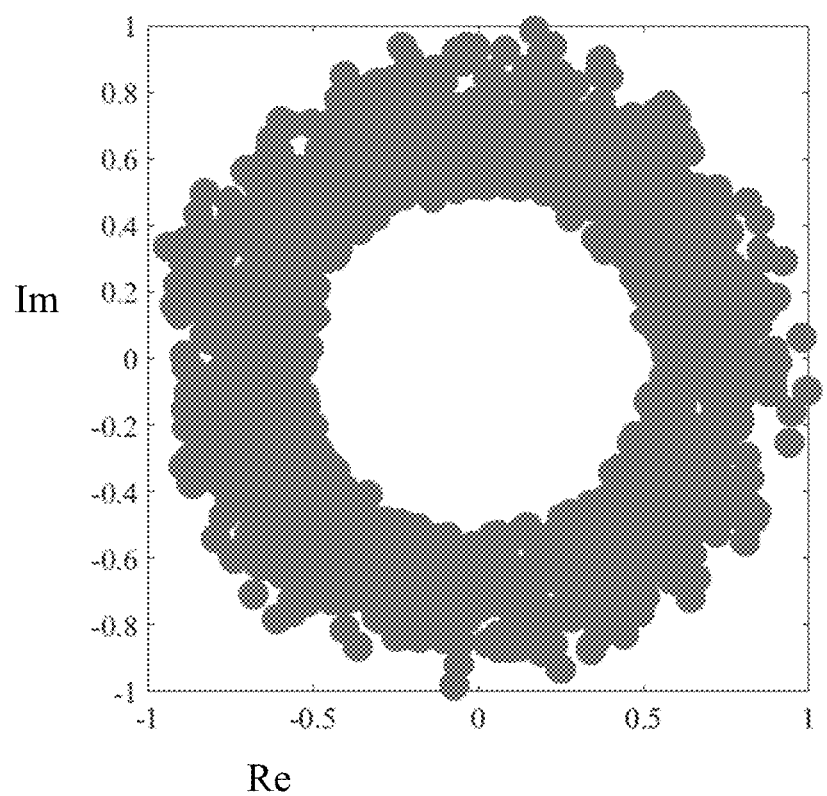
FIGS. 14a and 14b show complex plane plots of the symbol constellation of a received OFDM encrypted modulated baseband signal before after decryption, respectively.

Three sets of phase offsets each of length 1664 were generated by applying a subset of prime numbers in the second key set key2(N1) ($f_1$, $f_2$ and $f_3$ taking the same values of 47, 89 and 17 as in the single carrier case) in elliptical functions: $z1=\mod(\mod(f_1x^3+f_2x, f_3),2\pi)$, $z2=\mod(\mod(f_2x^3+f_3x, f_1),2\pi)$, $z3=\mod(\mod(f_3x^3+f_1x, f_2), 2\pi)$, and a fourth set was generated by taking the element-wise products of the first three sets to modulo 2pi according to $z4=\mod(z1*z2*z3,2\pi)$. The ratio of variance to mean was computed for each set of phases and the phases in the set having the highest ratio was chosen for encryption, for reducing the PAPR. This was computed at both nodes N1, N2 for symmetric encryption and decryption. The set z4 had the highest ratio and hence the phase values in set z4 were added to the phases of the 1664 active sub-carriers (excluding null sub-carriers) at N1 for encryption. FIG. 14a shows a constellation plot of the encrypted sub-carriers.

Figure 14B:
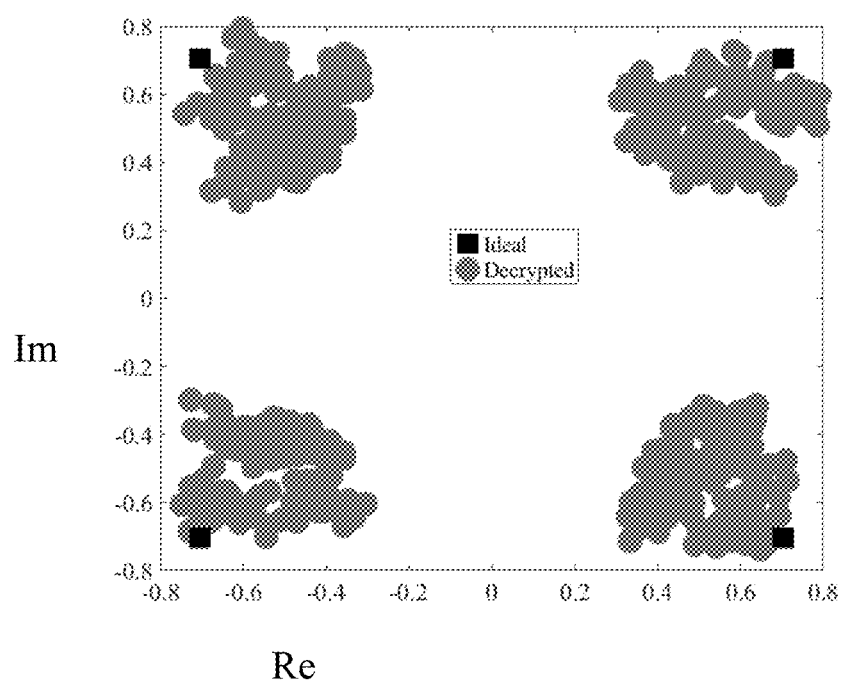

The inverse FFT of the encrypted sub-carriers was computed to yield the time domain signal and transmitted over the air interface at 28.9 GHz after the necessary signal processing operations. It was observed that the PAPR of the encrypted signal was reduced by 3 dB (discussed in more detail in the following section). The signal was received at N2, the FFT of the received signal was computed and the sub-carriers and subject to decryption of phases. This led to the successful recovery the transmitted constellation, as shown in the constellation plot in FIG. 14b. The amplitudes of the sub-carriers were equalized and symbols in the received constellation were decrypted by means of modulo subtraction of the encrypting symbols to recover the original symbols. The recovered symbols were demodulated to recover the original bit stream without errors. The validation was repeated five times successfully with different bit streams and encryption keys.

IId: PAPR Reduction

The effectiveness of PAPR reduction was tested by measuring the probability of the signal exceeding a threshold value. This may be expressed mathematically by means of a cumulative distribution function (CDF) of the form: Prob $(PAPR>PAPR_T)=1-(1-e^{-PAPR_T})^N$ where N is the number of sub carriers and $PAPR_T$ is the threshold PAPR value. Simulations were carried out in MATLAB for 10000 cycles of randomly generated bit streams, modulation and encryption of the sub-carriers with the same encrypting phases generated using the encryption key as that used for the experimental validation in the previous subsection. From this, it was possible to identify a scheme that would simultaneously reduce PAPR and provide physical layer security. The complex CDF plots for the resulting reduced PAPR signal are shown in FIG. 16. It can be seen that the proposed scheme reduces the PAPR by over 3.5 dB when there is a $2 \times 10^{-4}$ probability of the original signal exceeding a threshold PAPR of 15.5 dB.

The results in sections IIa-IId demonstrate that the proposed physical layer encryption technique can be successfully reversed at the legitimate receiver to recover the original modulated symbols with zero bit errors. The proposed physical layer encryption technique successfully conceals both single carrier and OFDM modulated signals from a well-positioned eavesdropper and a significant reduction of PAPR is also achieved for an OFDM signals.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination.

For the sake of completeness it is also stated that the term "comprising" does not exclude other elements or steps, the term "a" or "an" does not exclude a plurality, and any reference signs in the claims shall not be construed as limiting the scope of the claims.

The invention claimed is:

1. A method of encrypting a data signal for providing to an input of a radio frequency transmitter, the method comprising:

receiving the data signal comprising one or more first frequency components with a first phase profile in a frequency band of interest;

providing an encrypting signal filter comprising one or more frequency components in the frequency band of interest, the encrypting signal filter configured to change the first phase profile of the data signal it is applied to; and applying the encrypting signal filter to the data signal to generate an encrypted data signal comprising the one or more frequency components with a second phase profile, wherein the second phase profile is different to the first phase profile, wherein the step of providing the encrypting signal filter comprises generating the encrypting signal filter, and wherein generating the encrypting signal filter comprises:

providing a test signal filter comprising one or more frequency components in the frequency band of interest;

transforming the test signal filter from the time domain to the frequency domain to obtain a first filter phase spectrum having a first filter phase component at the or each frequency;

determining a first phase offset at the or each frequency;

applying, at the or each frequency, the determined first phase offset to the respective first filter phase component of the first filter phase spectrum to obtain a second filter phase spectrum having a second filter phase component at the or each frequency, one or more of the second filter phase component(s) being different to the first filter phase component(s); and transforming the transformed test signal filter from the frequency domain to the time domain to obtain the encrypting signal filter.

2. The method of claim 1, wherein the step of applying the encrypting signal filter to the data signal comprises:
convoluting the data signal with the encrypting signal filter; and/or
cross-correlating the data signal with the encrypting signal filter.

3. The method of claim 1, wherein the encrypting signal filter has a dispersive transfer characteristic in the frequency band of interest.

4. The method of claim 1, wherein the phase of the or each frequency component of the encrypting signal filter varies non-linearly across the frequency band of interest; and/or wherein the one or more frequency components of the encrypting signal filter has a first non-linear phase profile.

5. The method of claim 1, wherein the encrypting signal filter has a non-zero and/or non-linear group delay variation across the frequency band of interest.

6. The method of claim 1, wherein the determined first phase offsets have a maximum phase value based at least in part on the width of the frequency band of interest.

7. The method of claim 1, wherein determining a first phase offset at the or each frequency in the frequency band of interest comprises:
inputting, for the or each frequency in the frequency band of interest, a number representative of the respective frequency to a phase offset generator function having a maximum phase value based at least in part on the width of the frequency band of interest.

8. The method of claim 7, wherein the phase offset generator function is one or more of a linear, non-linear, oscillatory, parabolic and/or phase randomisation function.

9. The method of claim 7, comprising determining the maximum phase value based at least in part on the width of the frequency band of interest.

10. The method of claim 1, wherein the test signal filter comprises: an amplitude spectrum with a substantially uniform amplitude profile in the frequency band of interest; and/or a phase spectrum with a substantially linear phase profile in the frequency band of interest; and/or is or comprises a finite impulse response filter.

11. The method of claim 1, wherein the test signal filter is or comprises a truncated sinc function.

12. The method of claim 11, wherein the truncated sinc function is or comprises a sinc function multiplied by a window function.

13. The method of claim 12, wherein the window function is or comprises any one or more of: a Hamming window, a Blackman window, a Kaiser window, a Hanning window, a Hann window, or a Nuttall window.

14. A method of decrypting a data signal encrypted according to the method of claim 1, the method comprising:
receiving the encrypted data signal comprising one or more frequency components in a frequency band of interest;

providing a decrypting signal filter comprising one or more frequency components in the frequency band of interest, the decrypting signal filter configured to change the second phase profile of the encrypted data signal it is applied to; and applying the decrypting signal filter to the encrypted data signal to generate a decrypted data signal comprising the one or more frequency components with a third phase profile, wherein the third phase profile is substantially the same as the first phase profile, wherein the step of providing the decrypting signal filter comprises generating the decrypting signal filter, and, wherein generating the decrypting signal filter comprises:
providing a test signal filter comprising one or more frequency components in the frequency band of interest;

transforming the test signal filter from the time domain to the frequency domain to obtain a first filter phase spectrum having a first filter phase component at the or each frequency;

determining a second phase offset at the or each frequency;

applying, at the or each frequency, the determined second phase offset to the respective first phase component of the first phase spectrum to obtain a third filter phase spectrum having a third filter phase component at the or each frequency, one or more of the third filter phase component(s) being different to the first filter phase component(s); and transforming the transformed test signal filter from the frequency domain to the time domain to obtain a decrypting signal filter.

15. The method of claim 14, wherein the step of applying the decrypting signal filter to the encrypted data signal comprises:
convoluting the encrypted data signal with the decrypting signal filter; or cross-correlating the encrypted data signal with the decrypting signal filter.

16. The method of claim 14, wherein:
the decrypting signal filter has a dispersive transfer characteristic in the frequency band of interest, and/or a non-zero and/or non-linear group delay variation across the frequency band of interest; and/or the phase of the or each frequency component of the decrypting signal filter varies non-linearly across the frequency band of interest; and/or the one or more frequency components of the decrypting signal filter has a second non-linear phase profile that is different to the first non-linear phase profile of the encrypting signal filter.

17. The method of claim 14, wherein the second phase offset(s) are determined by inverting the first phase offset(s) used to generate the encrypting signal filter.

18. The method of claim 1, wherein the data signal is a modulated baseband signal generated according to a modulation scheme in the frequency band of interest.

19. The method of claim 18, wherein the modulated baseband signal comprises a plurality of modulation symbols having a modulation symbol period, each symbol encoding one or more bits of information.

20. The method of claim 18, wherein the modulated baseband signal has a first modulation symbol constellation, the encrypted data signal has a second modulation symbol constellation that is different to the first.

21. The method of claim 20, wherein the decrypted data signal has a third modulation symbol constellation that is substantially the same as the first modulation symbol constellation.

* * * * *